(12) United States Patent
Hecht et al.

(10) Patent No.: US 12,544,839 B2
(45) Date of Patent: Feb. 10, 2026

(54) TOOL ASSEMBLY CONFIGURED FOR SWISS MACHINING

(71) Applicant: ISCAR, LTD., Tefen (IL)

(72) Inventors: Gil Hecht, Nahariya (IL); David Ben Harouche, Nahariya (IL)

(73) Assignee: ISCAR, LTD., Tefen (IL)

( * ) Notice: Subject to any disclaimer, the term of this patent is extended or adjusted under 35 U.S.C. 154(b) by 445 days.

(21) Appl. No.: 18/067,036

(22) Filed: Dec. 16, 2022

(65) Prior Publication Data

US 2023/0121524 A1 Apr. 20, 2023

Related U.S. Application Data

(63) Continuation of application No. PCT/IL2021/050717, filed on Jun. 15, 2021.

(60) Provisional application No. 63/049,395, filed on Jul. 8, 2020.

(51) Int. Cl.
*B23B 27/16* (2006.01)
*B23B 29/04* (2006.01)
*B23B 27/04* (2006.01)

(52) U.S. Cl.
CPC ............ *B23B 29/043* (2013.01); *B23B 27/04* (2013.01); *B23B 2205/02* (2013.01)

(58) Field of Classification Search
CPC . B23B 29/043; B23B 2205/02; B23B 27/086; B23B 27/04; B23B 27/16
See application file for complete search history.

(56) References Cited

U.S. PATENT DOCUMENTS

| | | | | |
|---|---|---|---|---|
| 3,371,567 | A * | 3/1968 | Davis | B23B 29/24 82/158 |
| 4,443,136 | A * | 4/1984 | Kemmer | B23B 27/083 407/50 |
| 4,509,886 | A * | 4/1985 | Lindsay | B23B 27/04 407/107 |
| 5,308,197 | A * | 5/1994 | Little | B23G 5/18 407/103 |
| 7,597,508 | B2 * | 10/2009 | Hecht | B23B 27/04 407/103 |
| 7,972,090 | B2 * | 7/2011 | Jonsson | B23B 27/045 407/103 |
| 8,529,165 | B2 * | 9/2013 | Chistyakov | B23B 29/24 407/107 |

(Continued)

FOREIGN PATENT DOCUMENTS

| CN | 101547762 A | 9/2009 |
|---|---|---|
| CN | 111230161 A | 6/2020 |

(Continued)

OTHER PUBLICATIONS

International Search Report dated Nov. 10, 2021, issued in PCT counterpart application No. PCT/IL2021/050717.

(Continued)

*Primary Examiner* — Sara Addisu
(74) *Attorney, Agent, or Firm* — Womble Bond Dickinson (US) LLP

(57) ABSTRACT

A grooving or part-off tool assembly for Swiss-style machining includes a holder. The holder includes a resilient normally-closed holder clamp. In a preferred embodiment the holder clamp biases a blade holding a cutting insert against a pocket side abutment surface of a holder pocket.

8 Claims, 9 Drawing Sheets

(56) References Cited

U.S. PATENT DOCUMENTS

| | | | |
|---|---|---|---|
| 8,678,718 B2* | 3/2014 | Hecht | B23B 27/1614 407/104 |
| 8,701,537 B2* | 4/2014 | Baernthaler | B23B 27/045 83/843 |
| 8,740,511 B2 | 6/2014 | Hecht | |
| 9,259,788 B2 | 2/2016 | Malka | |
| 9,901,986 B2 | 2/2018 | Makhlin et al. | |
| 10,471,517 B2 | 11/2019 | Hecht et al. | |
| 10,583,495 B1 | 3/2020 | Shaheen | |
| 10,758,986 B2* | 9/2020 | Vöge | B23B 27/145 |
| 2003/0156910 A1* | 8/2003 | Friedman | B23B 27/08 407/103 |
| 2003/0165362 A1* | 9/2003 | Hecht | B23B 27/08 407/107 |
| 2010/0158622 A1* | 6/2010 | Kaufmann | B23B 29/043 407/107 |
| 2011/0293382 A1 | 12/2011 | Chistyakov | |
| 2014/0356084 A1 | 12/2014 | Gustavsson | |
| 2018/0272431 A1* | 9/2018 | Athad | B23B 27/08 |
| 2019/0240741 A1 | 8/2019 | Hecht et al. | |
| 2022/0097247 A1* | 3/2022 | Hecht | B23B 27/08 |
| 2022/0219243 A1* | 7/2022 | Kato | B23B 27/16 |
| 2023/0092953 A1* | 3/2023 | Hecht | B23B 27/086 407/109 |
| 2023/0347426 A1* | 11/2023 | Kiso | B23C 3/28 |

FOREIGN PATENT DOCUMENTS

| | | | | |
|---|---|---|---|---|
| EP | 3939723 A1 * | 1/2022 | | B23B 27/04 |
| KR | 2009-0108209 A | 10/2009 | | |
| RU | 2098235 C1 | 12/1997 | | |

OTHER PUBLICATIONS

Written Opinion dated Nov. 10, 2021, issued in PCT counterpart application No. PCT/IL2021/050717.

Search Report dated Apr. 1, 2025, issued in Chinese counterpart application No. CN 2021800482515.

* cited by examiner

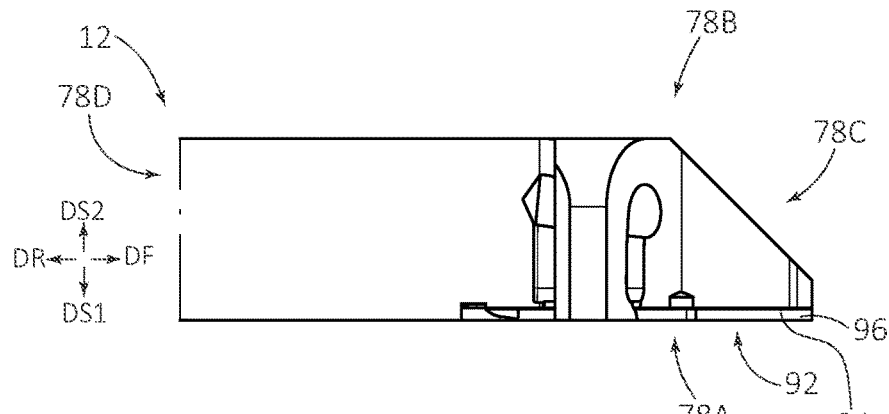
Fig. 6A
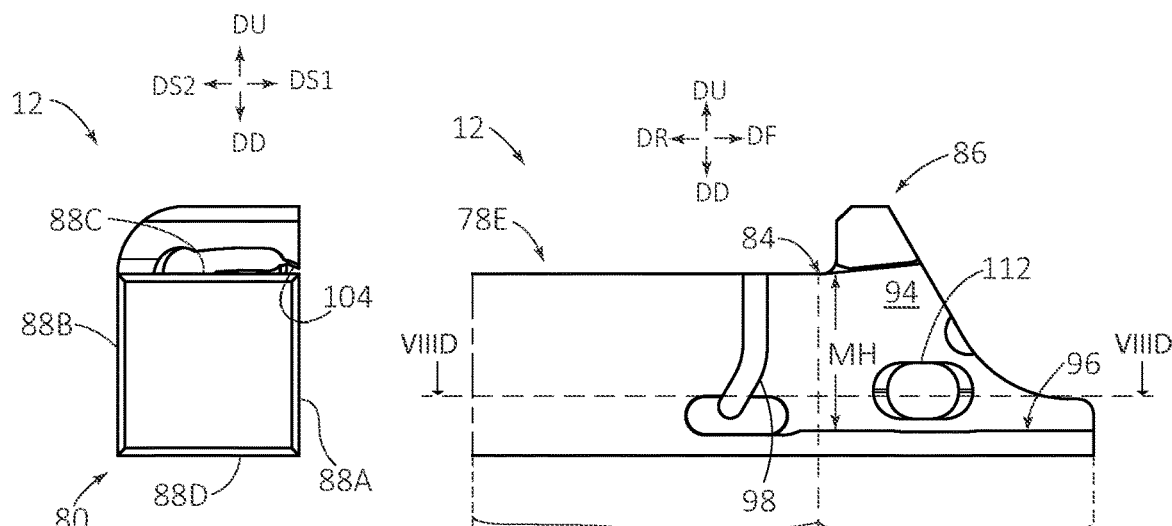
Fig. 6B
Fig. 6C
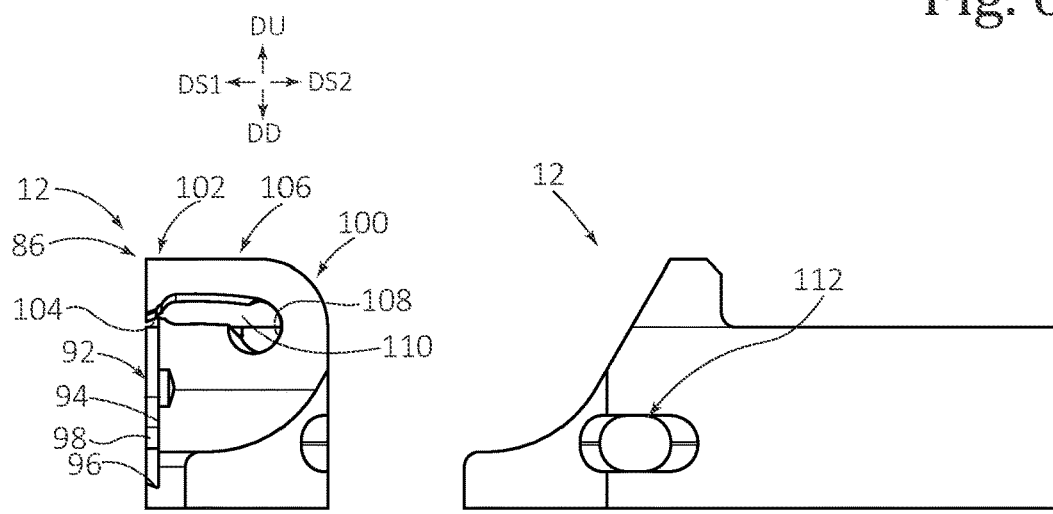
Fig. 6D
Fig. 6E

TOOL ASSEMBLY CONFIGURED FOR SWISS MACHINING

RELATED APPLICATIONS

This a Bypass Continuation of International Patent Application No. PCT/IL2021/050717 filed Jun. 15, 2021, and published as WO 2022/009194A1, which claims priority to U.S. Provisional Patent Application No. 63/049,395, filed Jul. 8, 2020. The contents of the aforementioned applications are incorporated by reference in their entirety.

FIELD OF THE INVENTION

The subject matter of the present invention relates to a tool assembly configured for so-called Swiss machining, more particularly grooving or parting-off operations.

BACKGROUND OF THE INVENTION

Hereinafter the names "Swiss" or "Swiss-style" are sometimes omitted for conciseness. It will be understood that the present design was designed first and foremost to operate within the unique limitations of Swiss-style CNC machines, but the advantageous design features may also be beneficial for even non-Swiss-style operations.

Swiss-style machining tool assemblies and components thereof are specially designed for use in so-called Swiss-style CNC machines (lathes) which are different to other typical CNC machines (lathes), in that Swiss-style tool assemblies are mounted close to each other tool in a "gang", and removing or mounting a cutting insert (or "insert") is difficult due to space limitations.

Unique traits of Swiss machining, such as the location of the cutting edge (the cutting edge being basically aligned with a top corner of a holder shank in a front view of a holder), are detailed further, inter alia, in the Applicant's previous patent publications U.S. Pat. Nos. 9,901,986 and 10,583,495, the contents of which are incorporated by reference in their entirety.

Briefly, for the present application it is further noted that, apart from the unique claimed chip former arrangement in U.S. Pat. No. 9,901,986, a common Swiss-type cutting insert (106) is shown with a screw hole (112) extending through the flank surface thereof. This design allows access for removing and replacing an insert in the closely packed Swiss-style tool assemblies.

Other common insert designs include a similar insert except with two such screw holes, as exemplified in the Applicant's publication U.S. Pat. No. 10,471,517. In said publication, a tool assembly is shown which allows removal and mounting of the insert from either one of two opposite sides.

In U.S. Pat. No. 10,583,495, a unique tool assembly is shown which provides an insert without said screw hole, and yet a different solution for overcoming the above-mentioned space limitations which create difficulties in securing and removing inserts.

It is an object of the present application to provide an improved tool assembly and components thereof suitable for use in a Swiss machining application, as well as providing an improved method of securing a component to a holder.

SUMMARY OF THE INVENTION

In accordance with a first aspect of the subject matter of the present application, there is provided a holder comprising: opposing holder first and second sides defining a first side direction from the holder second side towards the holder first side, and a second side direction opposite to the first side direction; opposing holder front and rear ends defining a forward direction from the holder rear end towards the holder front end, and a rearward direction opposite to the forward direction side direction; opposing holder top and bottom sides defining an upward direction from the holder bottom side towards the holder top side, and a downward direction opposite to the upward direction; a holder pocket located at an intersection of the holder first side, holder front end and holder top side; and a holder clamp located at the holder top side; the holder pocket comprising: a pocket side abutment surface extending along the holder first side and facing the first side direction; a pocket bottom abutment surface located downward of the pocket side abutment surface and facing the upward direction; and a pocket rear abutment surface located rearward of the pocket side abutment surface and facing the forward direction; the holder clamp extending over the pocket side abutment surface and comprising: a resilient hinge portion; a clamp portion comprising a clamp top abutment surface facing in the downward direction; and an intermediary portion extending from the resilient hinge portion to the clamp portion; wherein: the resilient hinge portion is configured to resiliently bias the clamp portion downwardly.

To summarize, the basic concept of the holder of the present invention is a so-called "normally-closed" integral, or more precisely resilient hinged, clamp. While a normally-closed upper jaw of an insert seat (also called an "insert pocket"; however the seat of the present application is called a "holder seat" since it is part of the holder and not to be confused with a seat of the blade) is known for clamping down on a cutting insert, such configuration is not generally known for Swiss tool assemblies. One reason believed that during typical Swiss machining operations a probe extends and impacts the cutting insert to locate the position thereof. It will be understood that any insert which is not secured with a screw (and in many cases two screws) raises the fear that the cutting insert will be dislodged from the desired position when impacted by the probe. Accordingly, except for rare exceptions, the typical Swiss machining tool assembly has a cutting insert with one or two bore holes for screw-mounting the cutting insert to a holder.

Nonetheless, the present concept has provided a secure mounting, and initial testing, so far, has found it to be sturdy enough to withstand said impacts.

Additionally, it should be noted that known normally-closed upper jaw for insert seats are typically longitudinally extending and not laterally extending. In the present invention the holder clamp extends over the pocket side abutment surface. Unlike holders for other applications, a comparatively high level of stability is required and hence the holder clamp of the present invention works in conjunction with a pocket side abutment surface in addition to a three-point contact of top, bottom and rear abutment surfaces. In other words, in contrast to, for example, a parting blade where the upper jaw of an insert pocket only extends longitudinally, the present invention allows the clamp to secure a blade or cutting insert against a pocket side abutment surface for stability (a particularly important factor for Swiss machining where the workpiece is typically not held at two ends as in other machining processes). Stated differently, the holder clamp of the present invention is a laterally-directed holder clamp and not a longitudinally-directed clamp or jaw. Preferably, the holder clamp extends at least partially in a first side direction (or preferably: extends exactly in the first side direction) to extend over the pocket side abutment surface. Stated yet differently, the holder clamp overhangs a pocket bottom abutment surface.

While laterally-directed clamps are not unknown in other machining applications, they typically include a screw to bring a so-called "normally-open" clamp into a closed position, which is not the present case. The reason the normally-open clamp design is advantageous over the "normally-closed" integral clamp design of the present invention, is that it typically has, in theory, longer tool-life than clamps which have resilient hinges (i.e. a resilient hinge will lose its resilience after a certain amount of usage, whereas screws can be replaced, etc.).

However, in the present design specifically conceived to benefit Swiss machining, accessing an upwardly facing screw in such a clamp is difficult, due to the space limitations of a typical Swiss-style gang (for example, there may be another holder closely mounted just above the one in question). Thus, the benefits of a normally-closed resilient holder clamp were decided to outweigh the detriments thereof.

It will be noted from the drawings that when it is stated that the pocket bottom abutment surface is located "downward" of the pocket side abutment surface, this refers to the majority of the pocket side abutment surface since the pocket bottom abutment surface and the pocket side surface meet at the lowermost area of the pocket side-abutment surface. Stated differently, "downward" does not mean they must be spaced-apart. This is similarly true for the pocket rear abutment surface located rearward of the pocket side abutment surface.

Further advantageous features of the holder will be described further below.

While the present invention will describe below aspects and preferred features of blades (which are themselves, by definition, configured to hold at least one cutting insert) according to the present invention, it is also possible for the holder of the present invention to directly secure a cutting insert (e.g. even a standard cutting insert such as a so-called DO-GRIP® cutting insert manufactured by the present applicant Iscar Ltd).

According to a second aspect of the present invention there is provided a tool assembly comprising a holder according to the first aspect and either a cutting insert or a parting blade directly secured in the holder pocket by the holder clamp. In the option where a parting blade is part of the tool assembly, the tool assembly can further comprise a cutting insert secured to the parting blade.

In the option with a blade, the cutting insert is preferably a single-cutting edged solid cutting insert (e.g. a standard cutting insert such as a so-called SELF-GRIP® cutting insert manufactured by the present applicant Iscar Ltd).

The cutting insert or blade according to this aspect can comprise a propulsion hole, as further described below.

However, even though a cutting insert with a propulsion hole is a feasible possibility (not shown, although it could be the same geometry of the blade and cutting insert shown, albeit with a unitary construction and made of a cutting insert material such as cemented carbide), it is preferred that the cutting insert be of solid construction (stated differently, devoid of any hole such as for receiving a clamping screw to secure the insert) since it can then be pressed in a simple and economical manner. As noted above, commonly Swiss cutting inserts have one or two holes extending through the flanks thereof which allow strong constructional attachment to a holder but significantly raise the manufacturing cost thereof. Utilizing a resilient holder clamp, a far simpler and cheaper solid cutting insert, such as the aforementioned DO-GRIP® cutting insert (or other), can be utilized. Similarly, with the option of a blade and cutting insert secured thereto, the aforementioned SELF-GRIP® cutting insert (or other) can be utilized.

As will be described below, a blade with said propulsion hole can allow an advantageous ease of assembly together with the capability to use a simple cutting insert with a solid construction.

It is particularly advantageous to form the cutting inserts with tapered top and/or bottom surfaces, most preferably where both the top and bottom surfaces are tapered.

Accordingly, except for one preferred embodiment of the above-mentioned cutting insert with a propulsion hole (which is beneficial for the unique securing method described in the third aspect below) all of the other embodiments and aspects allow a far more economical cutting insert to be utilized (e.g. a SELF-GRIP® or like cutting insert), when compared to a typical Swiss cutting insert with a hole opening out to the flank thereof.

While resiliently clamping of cutting inserts is known, it is not known to the applicant for Swiss-machining which typically includes the above-described impacting of the cutting insert with a probe, certainly not with a laterally-directed resilient clamp as explained.

According to a third aspect of the present invention, there is provided a method of securing a cutting insert or blade to a holder according to the first aspect. Such method can comprise a first step of placing the cutting insert or blade partially on the holder pocket in a semi-mounted state (or "semi-mounted position"), and a second step of applying a rearward force on the cutting insert or blade. The rearward force causing the cutting insert or blade to slide in the rearward direction along the pocket abutment surface, abutting and raising the clamp top abutment surface, until the rearward movement is stopped by the cutting insert or blade abutting the pocket rear abutment surface, thereby bringing the cutting insert or blade to a fully-mounted state (or "fully-mounted position").

In other words, the entire securing of the clamping insert or blade is achieved with a single rearwardly directed force applied on the cutting insert or blade. Stated differently, the method is devoid of a step where the user or a tool held by the user directly contacts the holder clamp to move it.

The rearwardly directed force could be applied at a forwardmost portion of the cutting insert or blade (for example with a soft-nose hammer). Alternatively, a standard two-pinned cutting insert insertion tool could be rotated in a hole formed in the holder (in the same manner that cutting inserts are typically inserted into insert pockets) and while the tool rotates, the force applied to the forwardmost portion of the cutting insert or blade is linear. Alternatively, in the most preferred embodiment shown in the drawings, a novel propulsion hole exemplified in the drawings (which in the exemplified embodiment is a blade) is formed in a blade (or cutting insert) and a rearwardly directed force is applied to it. In the latter embodiment, the rearwardly directed force could be applied at an internal (rather than peripheral) portion of the cutting insert or blade.

While the method is called a method of "securing", a third step for removal may include applying a forward force on the cutting insert or blade, causing the cutting insert or blade to slide in the forward direction along the pocket abutment surface, abutting and raising the clamp top abutment surface until arriving at the initially semi-mounted state where a subsequent removal step is possible. For the first two embodiments mentioned in the previous paragraph, this could be achieved with a relief hole or recess located at a rearward end of the holder pocket. For the third embodiment, the forward force could be applied internally to the propulsion hole.

Alternatively, according to a fourth aspect of the present invention, there is provided a different method of securing a cutting insert or blade to a holder according to the first aspect. In this aspect the user, or more specifically a tool held by the user (the tool being called a propulsion-key in the embodiment shown) directly moves the holder clamp. Such method can comprise a first step of applying an upward force on the holder clamp such that the clamp portion is moved away from the pocket bottom abutment surface, and a second step of placing the cutting insert or blade partially on the pocket bottom abutment surface. A subsequent, preferred but optional, step may be applying a rearward force on the cutting insert or blade until the rearward movement is stopped by the cutting insert or blade abutting the pocket rear abutment surface. Following the second or third step, the holder clamp is released such that it resiliently moves towards the pocket bottom abutment surface securing the cutting insert or blade.

For such method, it is preferred that the holder clamp be formed with lever receiving construction. Alternatively, for example, a tool could be wedged between the holder clamp, preferably an intermediary portion thereof, and the holder top side and the holder clamp could be leveraged upwardly. However, the prior option of a lever receiving construction (exemplified in the drawings as a clamp hole) is preferred for control purposes. It will be understood that such tools may be extremely small and significant force is required to clamp a cutting insert or blade for machining, hence it is quite easy to apply excessive force to a resilient clamp holder and damage it. Thus, said lever receiving construction is preferred. Even more preferred, for the same reason, is the holder pocket hole exemplified in the initial embodiment in the drawings, in which the holder clamp cannot be damaged by application of excessive force to the holder clamp (since in such embodiment the user does not directly contact the holder clamp but the cutting insert or blade indirectly applies only a controlled upward force (limited by a precisely manufactured height) thereon.

While the method is called a method of "securing" for removal, there may be a step of applying the same upward forward force on the holder clamp such that the clamp portion is moved away from the pocket bottom abutment surface, and a subsequent step of removing the cutting insert or blade from the pocket rear abutment surface. The holder clamp can subsequently be released such that it resiliently moves towards the pocket bottom abutment surface.

The aspects described above have been optionally directed to either a cutting insert or blade (configured itself to hold a cutting insert), held by the holder according to the first aspect. The following aspects are specifically directed only to a blade configured with a blade seat for holding a cutting insert.

Blades configured for Swiss machining are not common, and perhaps do not exist. By "blades" for the purposes of the specification and claims, it is meant a component configured to hold a cutting insert and configured to be mounted to a holder, the holder being configured to be mounted to a machine turret or gang. Stated differently, the word blade as used herein excludes (is not intended to refer to) components with blade portions and integral (enlarged cross-section) shanks (typically having a square cross-section) which are configured to be directly held in a machine turret or gang.

While blades are known for standard CNC machining operations, a first reason they are not known for Swiss machining is that a typical Swiss machining operation is dedicated to extremely small applications and consequently only very small tool assemblies are used. To provide some perspective, the blade exemplified in the drawings has a maximum blade height BH of about 11 mm, a maximum blade length BL of about 22 mm, and a maximum blade thickness BT of less than 1 mm. In other words, the blade itself is similar in size to a SIM card or fingernail. Given that known blades are significantly larger, a more fitting name for the blades of the present application could be a "microblade" or "miniature blade". However, since such name is not in normal usage at this time, dimensions will be provided to differentiate from prior art blades designed for different machining applications.

Reverting to the present invention, it is theorized that one reason blades are not used in Swiss machining is that at the above-described miniature sizes a cutting insert can be used without the additional component of a blade required for a tool assembly. While cutting inserts, typically of cemented carbide, are often small due to pressing and cost restrictions, certainly the size under discussion is common for cutting inserts.

It is preferred to have fewer components in a tool assembly because there is a loss of rigidity for each extra component held (i.e. a tool assembly with a holder, blade and cutting insert will be less rigid than a tool holder with a holder that directly holds a cutting insert).

Furthermore, the preferred blades of the present invention are made of metal, more preferably steel, as is typical in the metal-cutting industry for components other than cutting inserts. However, as known, metal blades (particularly those which are thin as is desired for grooving and parting-off) are more prone to bending than cutting inserts which are made of harder material (typically cemented carbide). Thus, clearly the first design choice for a Swiss tool assembly is a cutting insert and not a blade which in turn holds a cutting insert.

The present invention is based on the observation that typical Swiss tool assemblies comprise relatively expensive cutting inserts, and that a loss in rigidity from using blades for the reasons mentioned above is outweighed by the economic benefits (particularly of a solid cutting insert, even more preferably a single cutting-edged cutting insert for the reasons descried below). Thus, the present invention utilizes a blade in the discovery that an economical solid cutting insert (i.e. more economical than the known Swiss cutting inserts with holes formed in the flanks thereof) can subsequently be utilized.

However, utilization of a blade for Swiss machining includes unique difficulties.

As mentioned, while Swiss machining typically includes a position measurement probe which abuts the cutting insert, upon testing it was found, thus far, that the preferred embodiment utilizing not only a cutting insert not secured with a screw, but also a blade not secured with a screw, is sturdy enough not to be dislodged by the probe's impact.

Regarding the issue of the blade being more bendable than a cutting insert, the holder of the present invention preferably comprises a normally-closed holder clamp, thus the force which the clamp applies to the extremely small blade is controlled at the holder manufacturing stage and is not dependent on a user tightening a screw on the blade. Nonetheless, it will be understood that the blade aspects of the present invention are not limited to usage in a specific holder, although the normally-closed holder clamps of the present invention are of course preferred as they both protect the blades from being bent and solve the issue of space limitations in a Swiss gang configuration.

The normally-closed holder clamp also allows the blade to be clamped without a screw extending through the blade itself. It will be understood that for extremely thin metal blades, a screw abutting the side thereof can cause undesired bending of the blade.

Further, the laterally-directed holder clamp provides additional stability over longitudinally-directed holder clamps, as is desired for Swiss operations.

After the initial concept was found feasible, further advances into preferred blade mounting features were developed. Namely, the embodiment with a propulsion hole is described above, and could be incorporated in any one of the other aspects comprising a blade. As will become clear, such propulsion hole minimizes the chance of any bending of the blade.

Each of the aspects below focuses on an independent advantageous feature discovered for a blade according to the present invention. Yet, all of said features can be incorporated into any blade of the present invention.

According to a fifth aspect of the present invention, there is provided a blade comprising: opposing blade first and second sides; opposing blade front and rear edges; opposing blade top and bottom edges; first and second blade seats, each of which comprising a base seat jaw and a second seat jaw opposing the base seat jaw, and configured for resilient clamping; a maximum blade height BH measured from the blade bottom edge to the blade top edge; a maximum blade length BL, perpendicular to the maximum blade height BH, and measured from the blade front edge to the blade rear edge; and a maximum blade thickness BT, perpendicular to the maximum blade height BH, and measured from the blade first side to the blade second side; wherein: the maximum blade thickness BT is smaller than the maximum blade height BH; the maximum blade length BL fulfills the condition: L<45 mm; the first blade seat opens out to the blade front edge; and the second blade seat opens out to the blade rear edge.

In summary, the present aspect differs from known blades in that while, essentially, a blade smaller than almost all typical blades is defined (L<45 mm), yet further comprises two blade seats. It is believed there are no known blades of similar size which also have the benefit of a second blade seat, doubling the productivity of the blade.

According to a sixth aspect of the present invention, there is provided a blade comprising: opposing blade first and second sides; opposing blade front and rear edges; opposing blade top and bottom edges; and a first blade seat opening out to the blade front edge; wherein: the first blade seat comprising a base seat jaw and a second seat jaw opposing the base seat jaw configured for resilient clamping; and a propulsion hole opening out to the blade first and second sides.

The novel propulsion hole of the present aspect can allow the blade to be mounted to a holder pocket with less concern of bending the relatively thin blade than would be the case if a rearward force is applied to a peripheral edge of the blade.

Such propulsion hole also allows a user-friendly way to mount a relatively tiny blade to a holder, as well as the numerous advantages mentioned above.

According to a seventh aspect of the present invention, there is provided a tool assembly comprising: a holder according to the first aspect and a blade according to the sixth aspect; the holder further comprising a holder guide hole opening out to the pocket side abutment surface.

Thus, a propulsion-key, which may be a simple cylindrical rod (or have additional features as described below) can be inserted through the propulsion hole and into the holder guide hole and then moved to apply a rearward force on the propulsion hole to move the blade rearwardly. While it is preferred that the hole be constricted to allow the key to be levered from the constricted portion of the hole, it is also possible for the hole to be merely enlarged relative to a propulsion hole of the blade or, for example, elongated in the rearward direction, and in such cases the entire propulsion-key can simply be inserted and moved in the rearward direction to move the blade. In either case the relatively more solid holder prevents damage to the relatively thinner blade. Of course, a constricted portion as shown in the drawings is preferred for a controlled propulsion of the blade.

Preferably, in any aspect where a blade comprises a propulsion hole, the propulsion hole comprises a hole inner surface which extends perpendicular to the blade first and second sides. This allows the propulsion hole to be produced simply, e.g. with a laser cutting process. To elaborate, other holes may be other than planar in that they are designed to receive a screw head (and thus are designed with a so-called bell-shape) or a threaded shank of a screw (and thus are designed with a threaded hole inner surface). Since the propulsion hole of the present invention is not designed to receive a screw, it can be as described above.

According to an eighth aspect of the present invention, there is provided a tool assembly comprising: a holder according to the first aspect and a blade resiliently held by the holder clamp to the holder, the blade comprising a blade seat configured for resilient clamping.

It will be understood that a blade resiliently held by a holder, the blade itself configured to resiliently hold a cutting insert is in itself not a trivial solution, since when removing the cutting insert from the blade seat, the blade could be accidentally ejected from the holder. This is all the more so when the direction of ejection of the blade and the cutting insert are the same (in the example shown in the drawings, both ejection directions are the forward direction). Thus, it is preferred that the holder clamp be configured to apply more clamping force to the blade than the clamping force the blade is configured to apply to a cutting insert held in the blade seat. Stated differently, a first clamping force applied on the parting blade in the holder pocket is greater than a second clamping force applied on the cutting insert in the blade seat.

Notably, the tool assembly and its components can be devoid of screws, which allows ease of manufacture and compactness (both because the screw(s) do not need to be accommodated and also threaded holes require relatively more thickness in a component than an unthreaded hole). Stated differently, the tool assembly can comprise only a holder, a blade and a cutting insert (such definition excluding tools used to insert and remove the blade and cutting insert, such as propulsion keys, and only being directed to the components participating during machining).

Stated differently, the tool assembly and its components can be devoid of threading. To elaborate, the tool assembly is devoid of threading for the purpose of mounting the blade to the holder and a cutting insert to the blade. There may be a screw or threading found for an unrelated purpose not relevant to the present invention. (for example a screw may be provided to allow adjustment of a shank in a turret). It will be understood that the features of the tool assembly being devoid of screws or threading relates to the resilient manner in which the blade is held to the holder and the cutting insert is held to the blade (or a resilient manner in which a cutting insert is held to the holder, in the alternative option).

In view of the unusual advantageous construction of a miniature blade it will be understood that a different way to define such blade, other than providing a numerical dimension, is to note the proportions of the blade seat and solid portion of the blade.

According to a ninth aspect of the present invention, there is provided a blade comprising: opposing blade first and second sides; opposing blade front and rear edges; opposing blade top and bottom edges; a first blade seat opening out to the blade front edge and comprising a base seat jaw and a second seat jaw opposing the base seat jaw, and configured for resilient clamping; a maximum blade height BH measured from the blade bottom edge to the blade top edge; a maximum blade length BL, perpendicular to the maximum blade height BH, and measured from the blade front edge to the blade rear edge; a maximum blade thickness BT, perpendicular to the maximum blade height BH, and measured from the blade first side to the blade second side; and a maximum seat length SL, parallel to the maximum blade length BL and measured from a forwardmost point of the first blade seat adjacent to the blade front edge to a rearwardmost point of the first blade seat distal to the blade front edge; wherein: the maximum blade thickness BT is smaller than the maximum blade height BH; the maximum blade length BL and the maximum seat length SL define a length-seat ratio BL/SL fulfilling the condition: BL/SL<5.

For blades with blade seats opening out to the blade front and rear edges, the compact size of the blade can be defined slightly differently than in the ninth aspect.

According to a tenth aspect of the present invention, there is provided a blade comprising: opposing blade first and second sides; opposing blade front and rear edges; opposing blade top and bottom edges; first and second blade seats, each comprising a base seat jaw and a second seat jaw opposing the base seat jaw, and configured for resilient clamping; a maximum blade height BH measured from the blade bottom edge to the blade top edge; a maximum blade length BL, perpendicular to the maximum blade height BH, and measured from the blade front edge to the blade rear edge; a maximum blade thickness BT, perpendicular to the maximum blade height BH, and measured from the blade first side to the blade second side; and a blade seat-to-seat length STS, parallel to the maximum blade length BL, and measured parallel to the maximum blade length BL between the most distal portions of the first and second blade seats; wherein: the first blade seat opens out to the blade front edge; the second blade seat opens out to the blade rear edge; the maximum blade thickness BT is smaller than the maximum blade height BH; the maximum blade seat-to-seat length STS and the maximum blade height BH define a seat-to-seat-height ratio STS/BH fulfilling the condition: STS/BH>1.2.

A similar, yet different definition is according to an eleventh aspect of the present invention, in which there is provided a blade comprising: opposing blade first and second sides; opposing blade front and rear edges; opposing blade top and bottom edges; a first blade seat opening out to the blade front edge, comprising a base seat jaw and a second seat jaw opposing the base seat jaw, and configured for resilient clamping; a maximum blade height BH measured from the blade bottom edge to the blade top edge; a maximum blade length BL, perpendicular to the maximum blade height BH, and measured from the blade front edge to the blade rear edge; and a maximum blade thickness BT, perpendicular to the maximum blade height BH, and measured from the blade first side to the blade second side; and wherein: the maximum blade thickness BT is smaller than the maximum blade height BH; the maximum blade length BL and the maximum blade height BH define a length-height ratio BL/BH fulfilling the condition: BL/BH>1.2.

It will be understood that the further defined blades of the ninth, tenth and eleventh aspects are directed to different definitions of the advantageous miniature blade particularly useful for Swiss applications and may be used with the previous method, holder and assembly aspects, as well as incorporated as additional features of the previous blade aspects.

A specific tool developed for a tool assembly with said clamp hole, holder guide hole or propulsion hole, is herein called a "propulsion-key". It will be understood that a propulsion-key in the form of a simple cylindrical rod can be used to secure the cutting insert or blade in a holder with a corresponding holder guide hole. However, it is preferred that the propulsion key have an increased cross-sectional portion. The increased cross-sectional portion is sized larger than the propulsion hole and holder guide hole to act as a stopper. This can ensure a user only needs to be concerned about a propulsion movement and not have to manually control the depth that the propulsion-key extends into the holder. It is also preferred that the propulsion-key comprise a handle.

Thus, according to a twelfth aspect of the present invention, there is provided a propulsion-key comprising: first and second key ends and an elongated intermediary key body extending therebetween; the propulsion-key further comprises a handle proximate the first key end; the second key end comprising a first cross sectional area; extending rearward of the second key end is an operational portion; the intermediary key body comprising a second cross sectional area; the second cross sectional area is larger than the first cross sectional area and is located between the handle and the second key end and constitutes an extremity of the operational portion.

Various preferred features connected to the propulsion-key will now be detailed.

Preferably the first cross sectional area is circular.

Preferably the second cross sectional area is circular.

Preferably the propulsion-key is made of metal, except for the handle.

Preferably the propulsion-key, except for the handle, has an elongated rod-shape. This of course does not mean that the cross-section need be uniform since differing cross sections are noted above. In other words, the elongated rod shape may have a radial step, ramp or other formation, at the transition between the first and second cross-sectional areas.

It will be understood that the propulsion-key according to this aspect is only a preferred embodiment and that even a cylindrical rod can be used.

According to any method aspect above, a further step can include the propulsion-key being inserted into either a clamp hole, holder guide hole or propulsion hole until axial movement is stopped by the second cross sectional area abutting the respective hole through which it was inserted. A subsequent step can be the propulsion key being levered or moved to propel a holder clamp, blade or cutting insert.

According to any tool assembly aspect above, the tool assembly can further comprise a propulsion-key having only a single cylindrical operational portion (i.e. excluding the two-pin keys used to insert a cutting insert with a rotational motion). Preferably the propulsion-key has a basic elongated rod-shape. The propulsion-key can further comprise any of the features described above. In such assembly the advantage can be that the entire assembly has fewer parts than a screw assembly. For example, in an assembly with a blade the entire assembly comprises only and exactly four components for assembly and operation (i.e. a holder, blade, cutting insert secured to the blade and a propulsion key). For example, in an assembly with only a cutting insert with a propulsion hole, the entire assembly comprises only and exactly three components for assembly and operation (i.e. a holder, cutting insert secured to the holder and a propulsion key).

A further advantage of the propulsion-key or method of mounting/removing a blade or cutting insert with a propulsion hole extending therethrough, is that even while ejecting the blade or cutting insert, the propulsion-key remains extending through the blade or cutting insert as well as through the holder, so that the blade or cutting insert is no longer secured to the holder but cannot fall to the floor.

Preferred additional features of the blade according to any one of the previous aspects are as follows.

Various preferred features connected to a blade's shape will now be detailed.

Regarding the compact shape of the blade, preferably the length-seat ratio BL/SL fulfills the condition: BL/SL<5, more preferably BL/SL<4, or most preferably BL/SL<3.5. To elaborate, as seen in the shown examples, the maximum seat length SL is measured from a corner (the most outward part of the blade seat) to a slot end. In cases where the blade has more than one blade seat and they are not identically shaped, the blade seat with the larger maximum seat length SL is intended to be used.

Alternatively or additionally defined, to further stabilize a blade for Swiss operations, a preferred yet optional reinforcement portion (shown in the drawings as "first and second reinforcement portions") extending not only below a blade seat but even forward thereof can be provided. Since such reinforcement portions are only optional, an alternative definition of the elongated blade shape can be defined with the maximum blade seat-to-seat length STS. In the example shown the blade seat-to-seat length STS is measured between first and second corners which are associated with the blade seat jaw of the blade seats. Preferably the seat-to-seat-height ratio STS/BH fulfills the condition: STS/BH>1.2, more preferably STS/BH>1.4. However, due to space restrictions in the horizontal direction, it is still desirable that the blade not be overly elongated in the horizontal direction. Accordingly, it is preferred that the seat-to-seat-height ratio STS/BH fulfill the condition: STS/BH<2.4, preferably STS/BH<2.0.

Regardless of the number of blade seats or their size, generally regarding the shape of the blade, while a regular shaped blade (triangular, square, hexagonal etc.) is feasible, for improved compactness in the vertical direction of a Swiss gang, it is preferable the blade be elongated. Additionally or alternatively, to the previous size definitions, the length-height ratio BL/BH preferably fulfills the condition: BL/BH>1.2, or preferably BL/BH>1.5. However, as there are also space restrictions in the horizontal direction, it is still desirable that the blade not be overly elongated in the horizontal direction. Accordingly, it is preferred that the length-height ratio BL/BH fulfill the condition: BL/BH<2.6, preferably BL/BH<2.4.

Regarding the dimensions in quantitative terms, it is preferred that the maximum blade length BL fulfill the condition: BL<45 mm, more preferably BL<35 mm and most preferably BL<30 mm. However, the blade cannot be reduced in length to zero. Accordingly, it is preferred that the blade length BL also fulfill the condition: BL>15 mm, preferably BL>20 mm.

Additionally or alternatively, it is preferred that the maximum blade height BH fulfill the condition: BH<45 mm, more preferably BH<25 mm and most preferably BH<20 mm. However, the blade cannot be reduced in height to zero. Accordingly, it is preferred that the blade height BH also fulfill the condition: BH>5 mm, preferably BH>10 mm.

For the sake of completeness, for parting-off operations a smallest possible blade thickness which provides sufficient structural strength is preferred. In the current application, the miniature blades of the present invention differ to normal parting blades which most commonly have a blade thickness of 2 mm or 3 mm. More particularly, it is preferred that the blades of the present invention have a maximum blade thickness BT fulfill the condition: BT<1.6 mm, more preferably BT<1.2 mm and most preferably BT<1.0 mm or even BT<0.8 mm. However, the blade cannot be reduced in thickness to zero. Accordingly, it is preferred that the blade thickness BT also fulfill the condition: BT>0.5 mm.

It is preferred that a blade have a planar shape (i.e. without any projection extending to the side directions from the blade first and second sides). To clarify, by projection it is not meant a mere thickening of a central portion of the blade to increase structural stability. It will be understood that certain adaptor-type components have laterally extending projections for mounting purposes and not for structural strength.

Various preferred features connected to blade seats and the cutting inserts held thereby will now be detailed.

It will be understood that as such small thicknesses blade seats are preferably resilient since there is little room for threaded holes to hold a screw. The resilient blade seats of the blade can be any known configuration. To elaborate, a resilient blade seat is devoid of a screw or clamp for holding a cutting insert to the seat but rather uses resilient movement of, typically one, of the seat's jaws. Each blade seat herein can comprise a base seat jaw (i.e. located below the cutting insert, or stated differently, on an opposite side of the cutting insert to a rake surface of the cutting insert), and a second seat jaw. The second seat jaw exemplified in the drawings herein extends above the cutting insert, and can be defined as located above the base seat jaw. Another known configuration is where the second jaw is located rearward of the base seat jaw, as shown in U.S. Pat. No. 9,259,788. In embodiments where a maximum blade thickness BT of the blade is extremely small (1 mm or smaller) it is preferred that a cutting insert be formed with opposing tapered surfaces and both the base seat jaw and second seat jaw be formed with tapered surfaces to assist mounting of the cutting insert in the bendable metal blade.

To avoid weakening an already tiny blade by removing too much material, it is preferred that the blade comprise less than three blade seats (i.e. either one or two blade seats). This is because a blade seat located under another blade seat which is holding a cutting insert active in machining will weaken the area underneath the active blade seat, which in cases of Swiss machining and/or extremely thin blades is far more significant than in larger blades. Thus it will also be understood why it is most preferred that the blade comprises exactly two blade seats (which makes the blade more economical than if it would have a single blade seat). It should be noted however that one blade seat is a feasible yet less preferred option, as are more than two blade seats for the reasons explained. However, certainly two blade seats is believed to be the optimal number.

Although it would be possible for the blade seats to be positioned at diametrically opposite corners (e.g. one located in the top right-hand corner and the other in the bottom left-hand corner, in a side view of the blade) it is preferred that a mirror symmetric arrangement be used (as exemplified, with one located in the top right-hand corner and the other in the top left-hand corner, in a side view). Stated differently, preferably both first and second blade seats open out closer to the blade top edge than to the blade bottom edge. Stated differently, it is preferred that both blade seats are adjacent the blade top edge.

This allows various advantages, e.g. a more compact blade design. Since the holder pocket is recessed within the cross-sectional profile of the holder, the blade can be elongated without affecting compactness (i.e. height, of particular importance in Swiss applications). Additionally, a blade pocket near the blade top edge and another near the blade bottom edge, while perfectly feasible, would also reduce support of the blade by the blade pocket along the blade bottom edge. In other words, the loss of support is lessened since the rear blade seat (i.e. the second blade seat in the drawings) is only associated with a minor abutment surface, namely the pocket rear abutment surface, which is essentially a stopper. It will be understood that the majority of the forces on a blade are in the downward direction. It will also be understood that irrespective of other design features, the full support of the blade on a pocket bottom abutment surface is advantageous over blades which are unsupported below the blade seat thereof.

Preferably a pocket bottom abutment surface extends underneath at least a portion of a forwardmost blade seat (i.e. an active blade seat, which in the drawings is shown as the blade first seat). More preferably, the pocket bottom abutment surface extends underneath the entire forwardmost blade seat, providing full support thereunder. In the most preferred embodiments, the pocket bottom abutment surface extends even forward of an area underneath the forwardmost blade seat. Of course, in the latter preference the portion can be called a reinforcement portion. Stated differently, the blade can comprise a reinforcement portion extending from underneath the forwardmost blade seat and forward thereof, as well as extending to the blade bottom edge. In an assembly, the reinforcement portion at the blade bottom edge abuts the pocket bottom abutment surface. It will be understood that this is more stable than traditional blades which typically are partially unsupported underneath the blade seats thereof. This can also be defined in relation to the blade alone, for example it is preferred that the blade bottom edge extend underneath the entire blade seat. It is more preferred that the blade bottom edge extend forward of the blade seat. Stated differently, it is preferred that a reinforcement portion extend from the blade seat to the blade bottom edge. It is preferred that the reinforcement portion extend forward of the blade seat.

While it has been explained that a solid cutting insert is preferred, it should be noted that also a single-cutting-edged insert is also preferred. While cutting inserts with more than one cutting edge (i.e. indexable cutting inserts) are more economical, they can also reduce cut depth. Additionally, in the holder shown in the first embodiment in the drawings, since the blade is inserted in a sliding motion, an extra cutting edge would impede such insertion due to impact with the pocket side abutment surface (this not being the case for the second embodiment where the holder clamp is lifted and a cutting insert or blade is inserted laterally). While an alternate pocket side abutment surface with a relief recess at the height of the cutting edge is a possibility, it would reduce stability of the blade adjacent the clamp portion and induce bending in the blade. Thus, the blade, at least for the sliding-motion embodiment, allows a far smaller, and hence more economical, cutting insert to be used.

For the definition of corners: a base seat jaw and the blade front edge can meet at a first corner. Similarly, in embodiments with two blade seats, another base seat jaw and blade rear edge can meet at a second corner. A second seat jaw and blade top edge can meet at a third corner. Similarly, in embodiments with two blade seats, another second jaw seat and the blade top edge can meet at a fourth corner.

Various preferred features connected to clamping and/or mounting will now be detailed.

While a holder clamp could, in theory, clamp a blade side to bias the blade against the pocket side abutment surface, a preferred option is for the blade top edge to comprise a top edge tapered portion.

To elaborate, said tapering can be from the blade first side surface towards the blade second side surface (a single slanted surface). More preferably, it tapers from both first and second side surface (i.e. a double-slanted surface such as an upside-down v-shape) to allow the blade to be indexed.

For similar considerations, it is preferred that the blade bottom edge comprise a bottom edge tapered portion, which could also be a single slanted surface but is preferably a double-slanted edge. It will be understood that when the blade comprises a top edge tapered portion, the corresponding clamp top abutment surface comprises a clamp top tapered portion. Similarly, when the blade comprises a bottom edge tapered portion, the corresponding pocket bottom abutment surface comprises a pocket bottom tapered portion.

To reduce the amount of force for lifting the resilient holder clamp, the blade's top edge tapered portion can preferably comprise a blade tapered top edge length TTL which is preferably smaller than a blade maximum (total) top edge length MTL of the blade top edge. More precisely, the blade maximum top edge length MTL and blade tapered top edge length TTL define a top-edge ratio MTL/TTL fulfilling the condition: MTL/TTL>2, or preferably MTL/TTL>3.

To provide further structural strength underneath a blade seat, which is where most forces are applied on a blade (i.e. in the downward direction as opposed to a rearward direction), a blade bottom edge is preferably longer than a blade top edge.

While both the blade top and bottom edges are preferably tapered to assist in holding the blade against lateral forces during machining, the structural strength at the top blade can be reduced (by shortening the length thereof) for a different advantage, namely to reduce the amount of force required to lift a clamp while allowing the blade tapered top edge to be moved into a fully-mounted state (which would take more time if a blade tapered top edge is relatively longer). Accordingly, it is preferred that a blade tapered top edge length TTL (i.e. a tapered portion of the blade top edge only) is shorter than a blade tapered bottom edge length TBL (i.e. a tapered portion of the blade bottom edge only), defines a tapered-portion ratio TTL/TBL<1. Preferably TTL/TBL<0.75, more preferably, TTL/TBL<0.50 and most preferably TTL/TBL<0.25.

Preferably the top edge tapered portion is located upward of the relieved portions. This also reduces the amount of force and/or time needed to lift a holder clamp. Preferably the top edge tapered portion is located between two relieved portions.

Preferably the top edge tapered portion extends both forward and downward on one side thereof, and both rearward and downward on the other side thereof. In other words, the top edge tapered portion can preferably have a peak or apex. This can further reduce the force/time required for clamping the blade.

Preferably, particularly for indexable blades with two blade seats adjacent the blade top edge, the top edge tapered portion is centrally located.

Preferably, the bottom edge tapered portion extends along the majority of the blade bottom edge. It will be understood that the longer a tapered portion is, the more lateral stability it will provide. This is in contradistinction to the shortened length of the top edge tapered portion which is preferred to be shortened for a different benefit. Most preferably, the bottom edge tapered portion extends along the entirely of the blade bottom edge.

The structural strength mentioned above can alternatively be defined by a blade comprising a reinforcement portion extending downwardly and forwardly from a blade seat. More precisely, the blade can comprise a first reinforcement portion, extending from a first corner in a downward and forward direction. In embodiments with a second blade seat opening out to a blade rear edge, the blade can comprise a second reinforcement portion, extending from a second corner in a downward and rearward direction. In the above definitions the first and second corners mentioned are located respectively where the first blade seat's base seat jaw meets the blade front edge, and where the second blade seat's base seat jaw meets the blade rear edge.

Preferably the blade bottom edge extends in a straight line in a side view of the blade. It will be understood that blades with a lower front stop (step-shaped) are not able to be indexed in the same sliding manner and hence are not designed with two blade seats at the blade front and rear edges thereof.

Various preferred features connected to the propulsion hole will now be detailed.

While blades of the prior art may have holes configured for ejection or mounting of cutting inserts (hereinafter called "ejection holes", designated "55" in FIG. 4C). The novel propulsion hole of the present invention is not an ejection hole. Accordingly, even in the present invention directed to a tiny blade, the blade still comprises an additional hole over the two ejection holes shown. Stated differently, a blade according to the present invention can comprise more holes than blade seats (e.g. in the examples shown two blade seats, two ejection holes and an additional hole being said propulsion hole. Stated differently, a blade according to the present invention can preferably have more holes than insert seats. Nonetheless, it is feasible that a single hole could be designed for a dual purpose.

Preferably a propulsion hole is symmetrically located between two blade seats.

Preferably a propulsion hole is located closer to a blade lower edge than the blade seat or blade seats (in embodiments with more than one blade seat). This may provide more structural stability for the blade than introducing a lack of material directly between two voids (i.e. the blade seats).

Preferably the propulsion hole is larger than each of the respective ejection holes.

Preferably a propulsion hole maximum dimension PH fulfills the condition PH>2 mm. More preferably PH>3 mm. However, for the miniature blades, to avoid weakening the blade excessively, it is also preferred that PH<5 mm. In the exemplary embodiment the propulsion hole is preferably cylindrical and the propulsion hole maximum dimension PH is a diameter as shown in a side view. However, the propulsion hole could also be another shape or even elongated. For ease of production, a cylindrical shape is the most preferred shape.

When the blade is mirror-symmetrically shaped about a plane mid-way between its forward and rear ends, it is preferred the propulsion hole be in the middle of the blade.

Various preferred features connected to the holder pocket will now be detailed.

While in theory the holder clamp could abut a cutting insert side or blade side, to more securely clamp, a clamp top abutment surface can preferably be inwardly slanted to face the downward and second side directions. This allows clamping forces to be directed to both the pocket side abutment surface and pocket bottom abutment surface. For similar reasoning, a pocket bottom abutment surface is preferably inwardly slanted to face the upward and second side directions. Most preferably, both the clamp top abutment surface and the pocket bottom abutment surface are inwardly slanted towards the pocket side abutment surface and each other.

While a feasible option would be for a pocket rear abutment surface to be slanted inwardly slanted towards the pocket side abutment surface, in embodiments where the pocket bottom abutment surface and/or the clamp top abutment surface is tapered, is more preferred that it is not slanted but preferably faces only the forward direction. Stated differently, preferably the pocket rear abutment surface is perpendicular to pocket side abutment surface. This is because the pocket bottom abutment surface and/or the clamp top abutment surface are already tapered, thereby providing enough lateral support and allowing a more economic pocket rear abutment surface (and corresponding cutting insert or blade rear edge) to be produced.

While the pocket bottom abutment surface could be formed as one or more point contacts, it is preferred that, in a side view of the holder first side in the second side direction, the pocket bottom abutment surface is elongated. By comparison, the pocket rear abutment surface can be relatively shorter as it mostly provides a stopper function (as opposed to the pocket bottom abutment surface which receives most of the machining forces).

Preferably, the pocket side abutment surface extends rearward of the clamp portion, preferably rearward of the entire holder clamp. This allows the blade to be structurally stronger (since the void which is constituted by the blade seat is relatively smaller than the material portion of the blade, than would be the case if the blade were shorter in a forward/rearward direction)

Preferably, the pocket rear abutment surface is located rearward of entire holder clamp.

Preferably, the pocket rear abutment surface faces in the downward and forward directions to assist in preventing rotation of a blade or cutting insert clamped to the holder.

Various preferred features connected to the holder clamp will now be detailed.

In accordance with some embodiments it is preferred the holder clamp is solid (i.e. devoid of a hole).

To allow movement without plastic deformation, it is preferred that the resilient hinge portion is spaced-apart from the first side. Preferably the resilient hinge portion extends from the top side of head, adjacent the holder second side. Additionally, preferably, the resilient hinge portion does not extend past the holder second side (allowing a more compact form).

Preferably the intermediary portion extends exactly only in the first side direction (i.e. reducing the forward overhang from the blade in a gang).

Various preferred features connected to the holder guide hole will now be detailed.

The holder guide hole could be a blind hole but is preferably a through hole opening out to both the holder first side (more precisely the pocket side abutment surface) and the holder second side. This allows the cutting insert or blade to be mounted and ejected with a propulsion-key from either side of the holder.

The holder guide hole is preferably elongated in the forward and rearward directions. The holder guide hole preferably has a constricted portion. The holder guide hole is preferably hourglass shaped (or stated differently, x-shaped).

It will be understood that since a screw is not intended to be used, the holder guide hole is preferably non-threaded. Similarly, it is preferred that the entire holder is non-threaded (or "threadless").

Various preferred features connected to the Swiss machining applications will now be detailed.

Regarding the basic structure of the holder: the holder preferably comprises an elongated shank portion and a head portion extending forward of the shank portion. This is structure, for example, differs from a typical blade holder construction such as that exemplified in U.S. Pat. No. 9,259,788.

The holder pocket is at least partially formed on the head portion at the holder first side.

Preferably the holder pocket extends rearward of the head portion (the head portion being defined from the holder front end until the rearwardmost point of the holder clamp).

The shank portion can comprise opposing shank first and second sides connected by shank top and bottom sides. All of these sides are preferably planar. While a square cross section is possible, a rectangular cross section is also a feasible option. For applications other than Swiss machining turret a different shaped shank portion, e.g. cylindrical is also feasible.

For compactness it is preferred that in a view of the holder front end (i.e. looking in the rearward direction) the entire holder be within the shank portion's shank first, second, top and bottom sides (i.e. the shank portion's cross section, or the shank's "front-facing profile"). This excludes the holder clamp, which out of necessity reduces the compactness of the holder. However, it is preferred that the head portion cross section only exceed the cross section of the shank portion (in the view mentioned above) at the holder clamp and not in additional directions.

Stated differently, it is preferred that in a front view of the holder (i.e. a view of the front end), only portion of the holder that exceeds a profile of the shank portion is in the upward direction. Stated differently, in a front view of the holder, the shank portion has a profile and the only portion of the holder that extends outside the shank portion's profile extends in the upward direction.

Similarly, with the exception of the blade top edge, in a view of the holder front end in the rearward direction, the blade is within the shank portion's cross section.

In a view of the holder front end in the rearward direction, the cutting edge of a cutting insert is preferably in the top (right-hand or left-hand) region of the holder (said region excluding the holder clamp from consideration).

BRIEF DESCRIPTION OF THE DRAWINGS

For a better understanding of the subject matter of the present application, and to show how the same may be carried out in practice, reference will now be made to the accompanying drawings, in which:

FIG. 6A is a top view of a holder of the tool assembly in FIG. 1A;

FIG. 6B is a rear view of the holder in FIG. 6A;

FIG. 6C is a side view of the holder in FIG. 6A;

FIG. 6D is a front view of the holder in FIG. 6A;

FIG. 6E is a side view of the holder in FIG. 6A, from a different side to that shown in FIG. 6C;

DETAILED DESCRIPTION

Figure 1A:
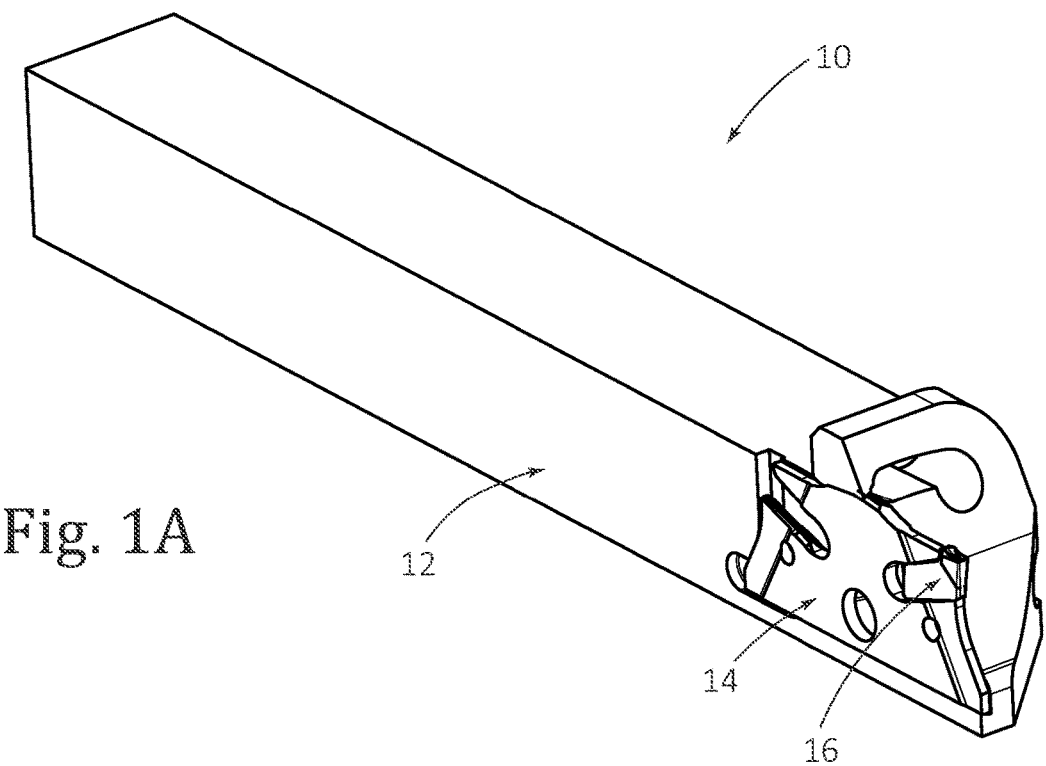
FIG. 1A is a side perspective view of a tool assembly in a fully mounted state (or stated differently "clamped" or "secured" state) according to the present invention.
Figure 1B:
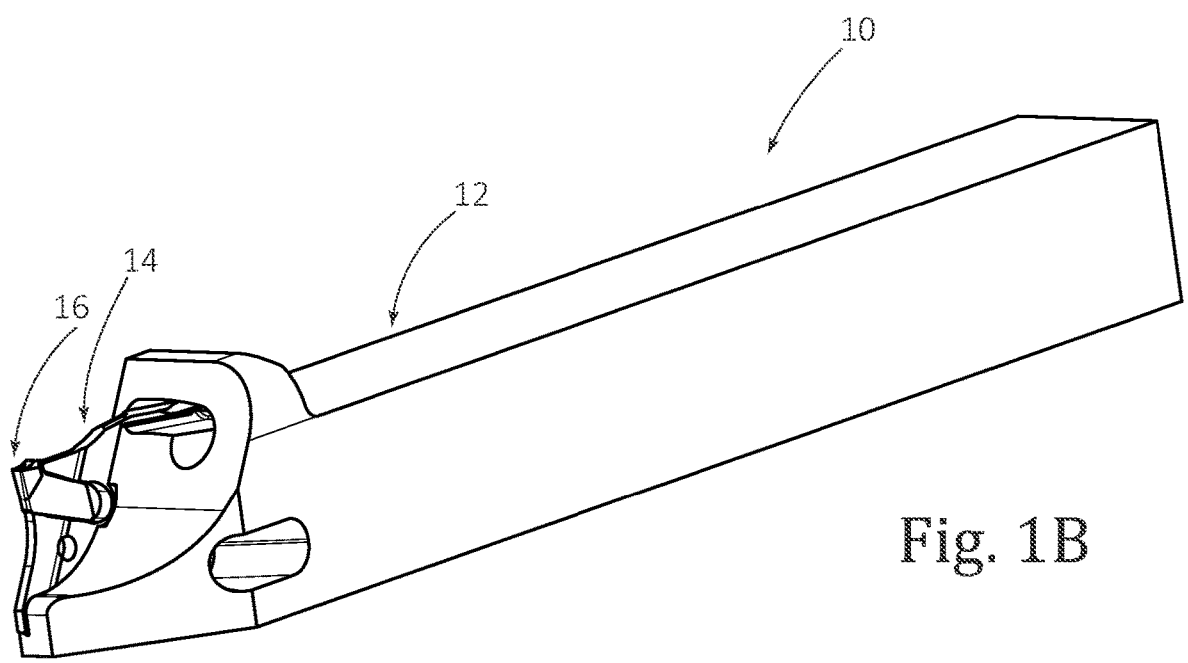
FIG. 1B is a side perspective view of the tool assembly in FIG. 1A, from a different side to that shown in FIG. 1A.

Referring to FIGS. 1A and 1B, a first Swiss tool assembly 10 is exemplified. The assembly 10 comprises a holder 12, a blade 14 mounted to the holder 12, and a cutting insert 16 mounted to the blade 14.

Referring to FIGS. 2A to 2D, the cutting insert 16 will be described in detail.

The cutting insert 16 is a standard single-edge solid cutting insert (sold under the marketing name SELF-GRIP® by the applicant) configured to be held by a resilient pocket.

The cutting insert 16 comprises a cutting portion 18 and a shank portion 20 extending therefrom.

The cutting insert 16 comprises a rake surface 22 (above which chips are intended to flow) and front, first-side and second-side relief surfaces 24A, 24B, 24C tapering inwardly with increasing distance from the rake surface 22.

The rake surface 22 preferably has a chip-forming arrangement 26.

A cutting edge 28 extends along the intersection of the rake surface 22 and front, first-side and second-side relief surfaces 24A, 24B, 24C.

The shank portion 20 comprises an upper shank surface 30A, a lower shank surface 30B, first and second side shank surfaces 30C, 30D, and a rear shank surface 30E.

The overall shape of the cutting insert 16, and particularly the shank portion 20 thereof is a basic straight elongated shape.

A cutting edge width CW of the cutting edge 28 is larger than a cutting body portion width CBW of the shank portion 20. Accordingly, this type of cutting insert can be used for grooving or parting operations with a depth that is not limited by the length of the cutting insert.

In this preferred example the cutting edge width CW is 0.8 mm.

Figure 2A:
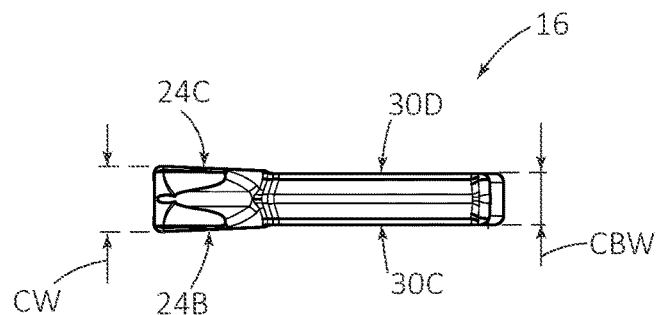
FIG. 2A is a top view of a cutting insert of the tool assembly in FIG. 1A.
Figures 2B, 2C, 2D:
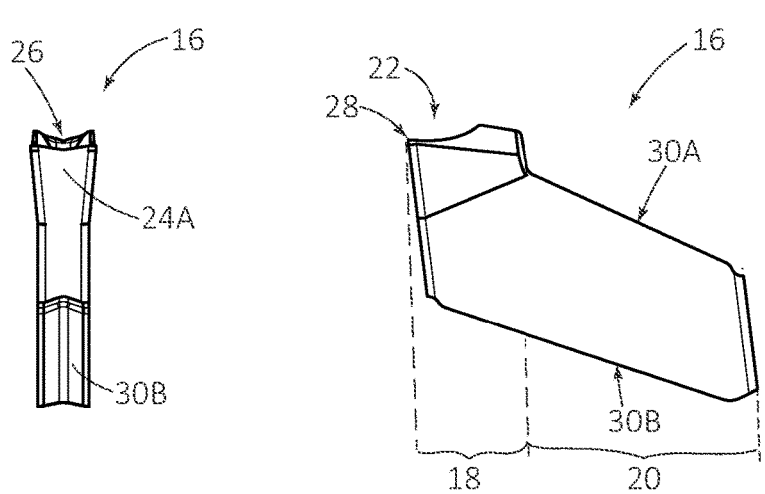
FIG. 2B is a front view of the cutting insert in FIG. 2A.
FIG. 2C is a side view of the cutting insert in FIG. 2A.
FIG. 2D is a rear view of the cutting insert in FIG. 2A.

The upper shank surface 30A is tapered. More precisely, as best seen in FIG. 2D the upper shank surface 30A tapers inwardly forming a basic concave shape.

The lower shank surface 30B is tapered. More precisely, as best seen in FIG. 2B the lower shank surface 30B tapers inwardly forming a basic concave shape.

For such small dimensions, it is preferred that both the upper and lower shank surfaces 30A, 30B be tapered to facilitate mounting of the cutting insert 16 to an extremely thin bendable blade 14.

Figure 3:
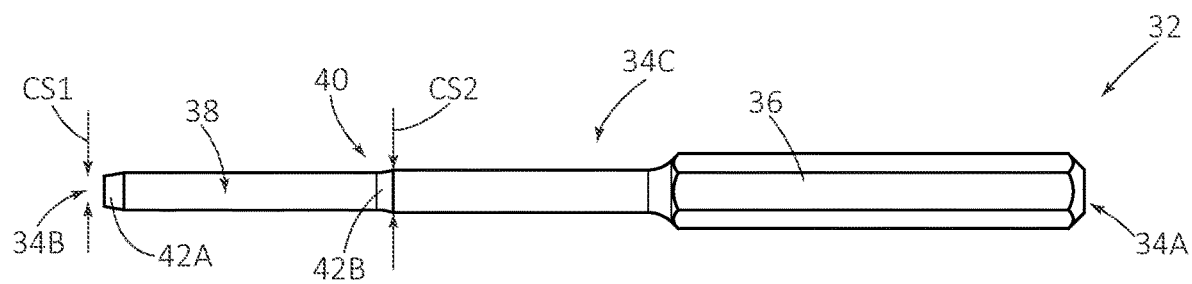
FIG. 3 is a side view of a propulsion-key.

Referring to FIG. 3, a propulsion-key 32 is exemplified.

The propulsion-key 32 comprises: first and second key ends 34A, 34B and an elongated intermediary key body 34C extending therebetween, a handle 36 is provided adjacent the first key end 34A.

The second key end 34B end comprises a first cross sectional area CS1, which in this example is circular.

Extending rearward of the second key end 34B is an operational portion 38 extending to an extremity 40 where the operational portion 38 comprises a second cross sectional area CS2, which in this example is circular, and, more importantly, is larger in at least one direction than the first cross sectional area CS1.

While the propulsion-key 32 comprises first and second frustoconical portions 42A, 42B, the basic shape shown is that of an elongated rod.

Referring to FIGS. 4A to 4E, the blade 14 will be described in detail.

The blade 14 comprises opposing blade first and second sides 44A, 44B, opposing blade front and rear edges 46A, 46B, and opposing blade top and bottom edges 48A, 48B.

In this example, the blade 14 further comprises two blade seats, namely first and second blade seats 50, 52, which are preferably identical as shown.

Each blade comprises a base seat jaw 54A, a second seat jaw 54B (which in this example is located above the base seat jaw 54A, and a slot end 54C connecting the base seat jaw 54A and the second seat jaw 54B.

The base seat jaw 54A is tapered, preferably for this example the taper is outward forming a basic convex shape to mate with the concave shape of the cutting insert's lower shank surface 30B.

The second seat jaw 54B is tapered. More precisely, as best seen in FIG. 2B the second seat jaw 54B tapers outwardly forming a basic convex shape to mate with the concave shape of the cutting insert's upper shank surface 30A.

The first blade seat's base seat jaw 54A and the blade front edge 46A meet at a first corner 56A.

The second blade seat's base seat jaw 54A and the blade rear edge 46B meet at a second corner 56B.

The first blade seat's second seat jaw 54B and the blade top edge 48A meet at a third corner 56C.

The second blade seat's second seat jaw 54B and the blade top edge 48A meet at a fourth corner 56D.

The blade first and second sides 44A, 44B are generally planar except that they comprise a thin portion 58A and a slightly thicker portion 58B. The reason for the different thicknesses is that the metal blade is so thin that it could bend under clamping and/or machining forces.

Figure 4A:
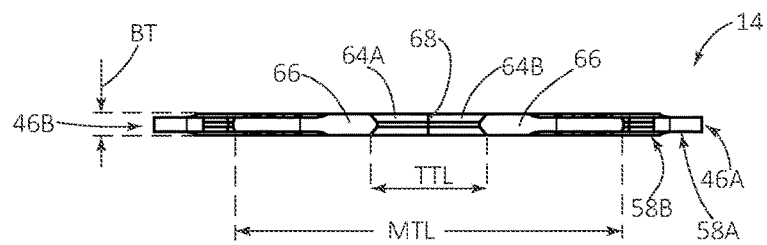
FIG. 4A is a top view of a blade of the tool assembly in FIG. 1A.
Figure 4B:
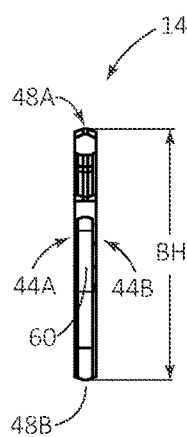
FIG. 4B is a front view of the blade in FIG. 4A.
Figure 4C:
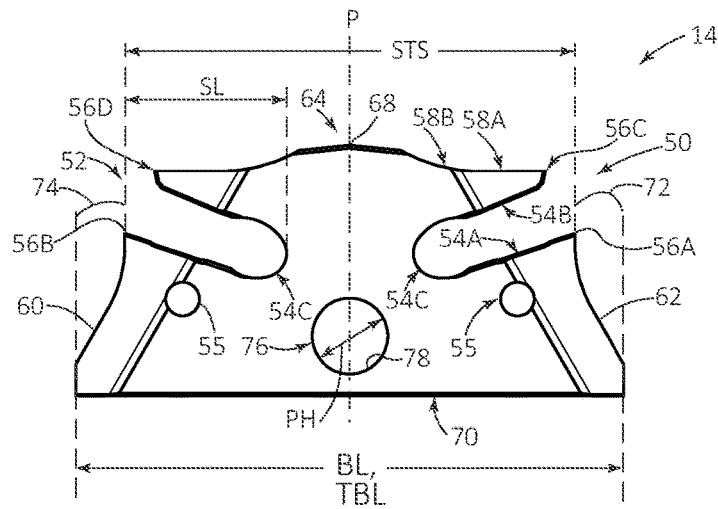
FIG. 4C is a side view of the blade in FIG. 4A.
Figure 5:
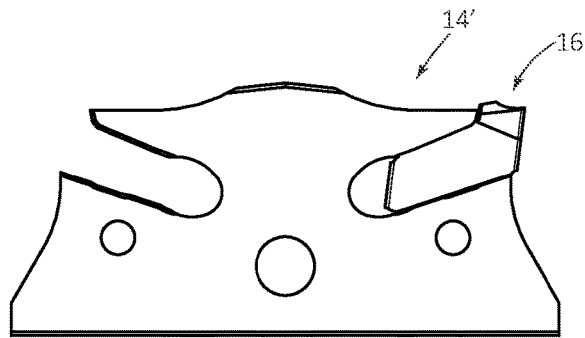
FIG. 5 is a side view of a different blade according to the present invention and a cutting insert mounted thereto.

Referring briefly to FIG. 5, an alternative slightly thicker blade 14' is sufficiently strong to withstand said forces and therefore only differs substantively from the blade in FIG. 4C in that it has a completely planar shape without any thinner or thicker portions.

The rear edge 46B comprises a flat rear abutment surface 60. Preferably, the flat rear abutment surface 60 is spaced apart from the second blade seat 52 so that if the second blade seat 52 is the first seat to be used in machining, if it is damaged during machining the blade 14 can still be indexed and used without the rear abutment surface 60 being damaged or bent (which is more likely with proximity to a blade seat). It will also be noted that the flat rear abutment surface 60 also extends rearwardly and downwardly (i.e. slanted) to further assist in preventing the blade 14 from rotating when a machining force is applied to a cutting insert 16 in the first blade seat 50.

The blade 14 is mirror symmetric about a plane P extending through the middle of the blade 14.

Accordingly, when the front edge 46A has a corresponding flat "rear abutment surface" designated 62 which will serve the same purpose as the rear abutment surface 60 when a cutting insert is mounted in the second blade seat 52.

Additionally, certain features are only designated with respect to one of the identical sides of the blade 14 for ease of readability. For example, the maximum seat length SL is only noted with respect to the blade second seat 52, but will clearly be identical for the blade first seat 52. In any case, noting the reversed directions for the second blade seat 52, the maximum seat length SL is measured from the second corner 56B to the slot end 54C.

Figure 4D:
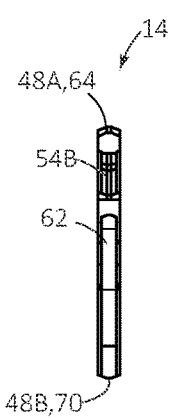
FIG. 4D is a rear view of the blade in FIG. 4A.

The blade top edge 48 comprises a top edge tapered portion 64 (i.e. having a convex shape as shown in FIG. 4D) and on either side thereof a relieved portion 66. By "relieved" it is meant that there is no tapered portion intended for abutment. As shown the so-called relieved portions 66 are lower than the tapered portion 64. Thus they could even be tapered but would not contact a corresponding holder clamp due to their height.

More precisely, the top edge tapered portion 64 comprises a first sub-tapered edge 64A slanted upwardly from the relieved portion 66 to an apex 68 the plane P. The first sub-tapered edge 64A being active in clamping when the blade first seat 50 is occupied with a cutting insert 16 and is active.

Slanted downwardly on the other side of the apex 68 is a second sub-tapered edge 64B.

Figure 4E:
FIG. 4E is a bottom view of the blade in FIG. 4A.

The blade bottom edge 48 comprises a bottom edge tapered portion 70 (i.e. having a convex shape as shown in FIG. 4D), which as shown in FIG. 4E extends along the entire blade bottom edge 48.

A first reinforcement portion 72 (shown in the drawings as "first and second reinforcement portions") extends below and forward of the forwardmost portion of the blade first seat (which in this example is the first corner 56A). This will provide additional structural support when a cutting insert (not shown) is mounted and operational in the blade first seat 50.

A second reinforcement portion 74 (shown in the drawings as "first and second reinforcement portions") extends below and rearward of the second corner 56A. This will provide additional structural support when a cutting insert (not shown) is mounted and operational in the blade first seat 50.

To give perspective regarding the shape of the exemplary blade 14, dimensions shown as quantifiable as follows: blade tapered top edge length TTL=5 mm; blade maximum top edge length MTL=18 mm; blade tapered bottom edge length TBL=maximum blade length BL=25 mm; blade height BH=11.5 mm; maximum blade thickness BT=1 mm; maximum seat length SL=8 mm; and blade seat-to-seat length STS=21 mm. Accordingly, in the given embodiment: a top-edge ratio MTL/TTL equals 18/5=3.6; a tapered-portion ratio TTL/TBL equals 5/25=0.2; a length-seat ratio BL/SL equals 25/8=3.1, a seat-to-seat-height ratio STS/BH equals 20/11.5=1.7; and a length-height ratio BL/BH equals 25/11.5=2.2.

In this embodiment a propulsion hole 76 opens out to the blade first and second sides. The propulsion hole 76 comprises a hole inner surface 78 which extends perpendicular to the blade first and second sides. A propulsion hole maximum dimension PH is shown and in this example where the propulsion hole 76 is cylindrical is the diameter thereof.

Referring to FIGS. 6A to 6E, the holder 12 will be described in detail.

The holder 12 comprises: a holder first side 78A; a holder second side 78B; a holder front end 78C; a holder rear end 78D; a holder top side 78E; and a holder bottom side 78F.

For understanding, directions are as shown: a first side direction DS1; a second side direction DS2; a forward direction DF; a rearward direction DR; an upward direction DU; and a downward direction DD.

The example holder 12 can further preferably comprise an elongated shank portion 80 and a head portion 82. An imaginary boundary plane 84 schematically shows where the shank portion 80 and the head portion 82 meet. In this example it will be understood that since forward of the imaginary boundary plane 84 there is an increase in cross sectional area which prevents the portion of the holder 12 (herein called the head portion 82) forward of the boundary plane 84 from being inserted into a turret (not shown) or gang (not shown) designed to clamp the shank portion 80.

The holder 12 further comprises a holder clamp 86 located at the holder top side 78E.

As noted in FIG. 6B, the shank portion 80 further comprises a shank first side 88A, a shank second side 88B, a shank top side 88C and a shank bottom side 88D. Notably in the rear and front views seen in FIGS. 6B and 6D, respectively, it is clear that the only direction in which a portion of the holder 12 extends outside the shank portion's profile (or "footprint", which in this non-limiting example is a square profile created by the planar-shaped shank first side 88A, shank second side 88B, shank top side 88C and shank bottom side 88D), is the upward direction DU (only exceeded significantly by the holder clamp 86). And the only portion of the holder 12 extending outside the shank portion's profile extends upwardly.

Figure 7A:
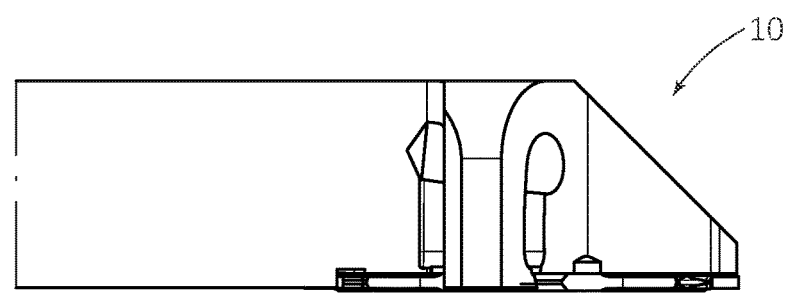
FIG. 7A is a partial top view of the tool assembly in FIG. 1A (the word "partial" is merely intended to mean that the entire holder is not shown)
Figure 7B:
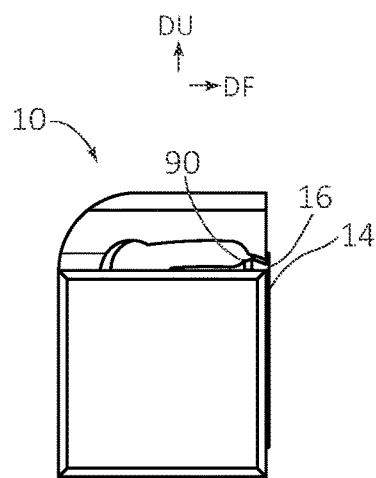
FIG. 7B is a rear view of the tool assembly in FIG. 7A.
Figure 7C:
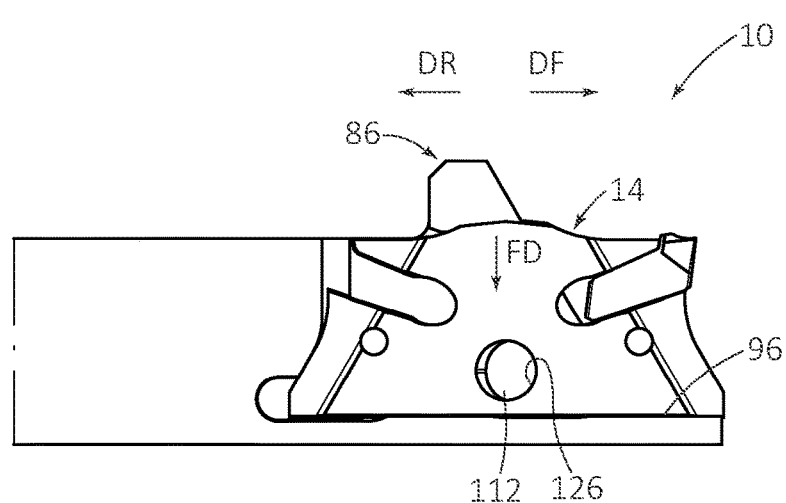
FIG. 7C is a partial side view of the tool assembly in FIG. 7A.
Figure 7D:
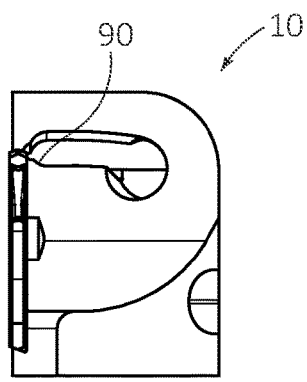
FIG. 7D is a front view of the tool assembly in FIG. 7A.
Figure 7E:
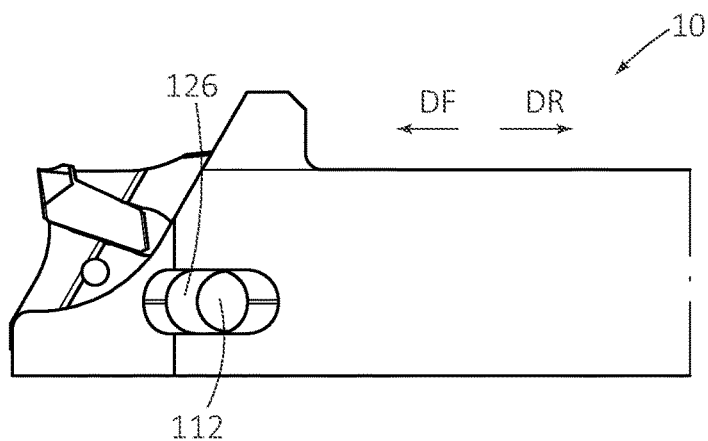
FIG. 7E is a partial side view of the tool assembly in FIG. 7A, from a different side to that shown in FIG. 7C.

For the sake of completeness, referring to FIGS. 7B and 7D, it is shown that the blade 14 and cutting insert 16 can exceed said profile slightly in the first direction DS1. However, this extension is not considered as significant (e.g. in this example the extension is less than 1 mm). Additionally, a small portion 90 of the head portion 82 extends further in the upward direction DU to ensure full support of the blade 14 against the head portion 82 (to prevent bending). However, said extension of the small portion 90 is not significant in increasing the compact shape of the holder 12 since the much larger holder clamp 86 already prevents the holder 12 from being further inserted rearwardly into a turret (not shown) or gang (not shown), and also extends in the upward direction DU far more than the small portion 90.

The holder 12 further comprises a holder pocket 92.

The holder pocket 92 comprises a pocket side abutment surface 94 extending along the holder first side 78A, a pocket bottom abutment surface 96, and a pocket rear abutment surface 98.

Notably, as shown in FIG. 6C, the holder pocket 92 extends rearwardly of the boundary plane 84. Stated differently, the holder pocket 92 extends rearward of the head portion 82. Accordingly, it can be said that the holder pocket 92 is partially formed on the head portion 82, although in a less preferred embodiment it could be formed fully on the head portion 82.

The pocket rear abutment surface 98 faces in the downward and forward directions DD, DF as best seen in FIG. 6C.

In FIG. 6C, a minimum pocket height PM is shown, measured parallel to the upward and downward directions DU, DD from the pocket bottom abutment surface 96 to the clamp top abutment surface 104

Reverting to the holder clamp 86, it further comprises a resilient hinge portion 100, a clamp portion 102 comprising a clamp top abutment surface 104 facing in the downward direction DD, and an intermediary portion 106 extending from the resilient hinge portion to the clamp portion.

Figure 10A:
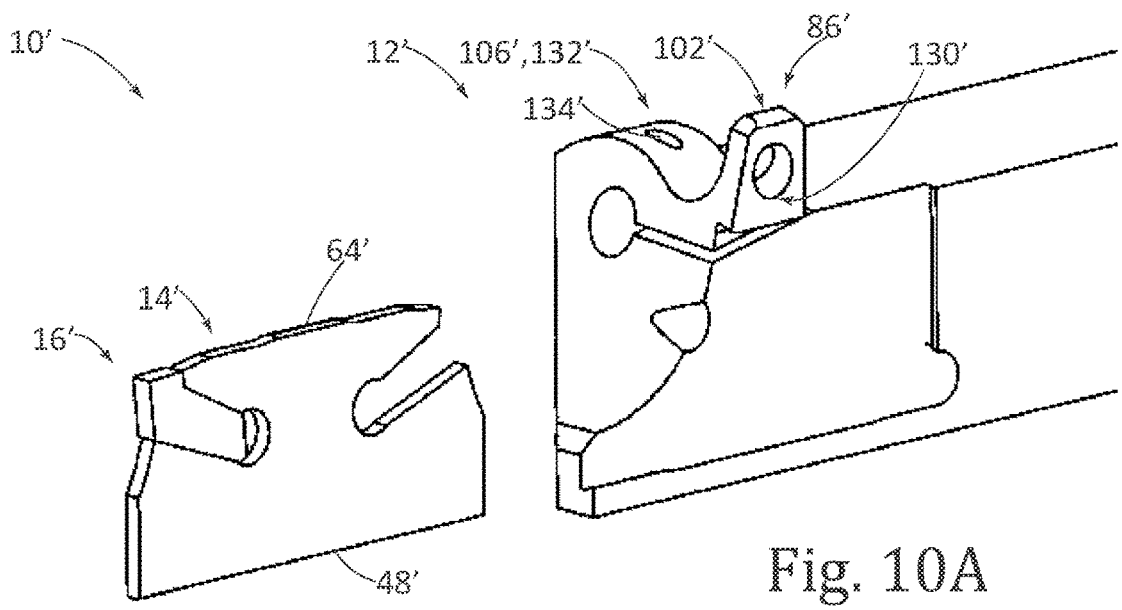
FIG. 10A is an exploded side perspective view of another tool assembly according to the present invention.

Notably, the resilient hinge portion 100 is integrally formed with the remainder of the holder 12 to have one-piece unitary construction therewith, and is hence configured to resiliently bias the clamp portion 102 downwardly when a force is applied to the clamp portion 102 in the upward direction DU. Such configuration can preferably include the inner edge 108 of the resilient hinge portion 100 being curved to reduce stresses (i.e. when the clamp top abutment surface 104 is moved in the upward direction DU to allow clamping), and also includes a clamp gap 110 located between the intermediary portion 106 and the remainder of the holder 12 thereunder to allow operation of the resilient hinge portion 100. Another additional feature is that the holder clamp 86 is solid (or stated differently, devoid of a screw hole of the type known from prior art clamps in which the clamp is screw-coupled to the holder). While the embodiment in FIGS. 10 and 11, includes a hole, the design thereof is previously unknown. Regardless, both examples are devoid of holes for receiving a screw as is known in prior art.

It can therefore be seen, that holder clamp 86 is configured to clamp a blade or insert without being screw-coupled to the holder 12 in which the blade or insert is retained.

Preferably, as best seen in FIG. 6A the intermediary portion 106 extends parallel with the first and second directions DS1, DS2. It will be understood that if it would be slanted in the forward or rearward directions DF, DR, it would likely reduce the amount the holder 12 could be inserted into a turret or gang (since the holder clamp 86 would further impede such insertion). Alternatively, the head portion 82 would need to be further elongated to achieve the same depth of cut because the (since the holder clamp 86 would impede the workpiece if left with the same head portion 82 size).

Notably, as best seen in FIG. 6D, the clamp portion 102 extends over the pocket side abutment surface 94.

For even more secure clamping, the clamp top abutment surface 104 is inwardly slanted to face the downward and second side directions DD, DS2.

Similarly, the pocket bottom abutment surface is inwardly slanted to face the upward and second side directions DU, DS2.

As seen best in FIG. 6C, the pocket bottom abutment surface 96 is elongated and as seen in FIG. 7C, for example, fully supports the entire blade 14.

While the present invention is generally directed to a resilient clamp-based tool assembly 10, a particularly advantageous assembly design and method was developed and is considered to be a completely independent advantageous invention.

Having said that, it clearly is advantageous when in combination with the aforementioned clamp-based holder 12 as shown.

As best seen in FIG. 6C, the holder 12 further comprises a holder guide hole 112 opening out to the pocket side abutment surface 94. In this example, the holder guide hole 112 is elongated in the forward and rearward directions DF, DR.

As best seen in FIG. 6E, the holder guide hole 112 is a through hole, opening out to the holder second side 78B, also allowing mounting or ejection to be also carried out from the holder second side 78B. Similarly, the holder guide hole 112 is elongated also at the holder second side 78B.

Figure 8A:
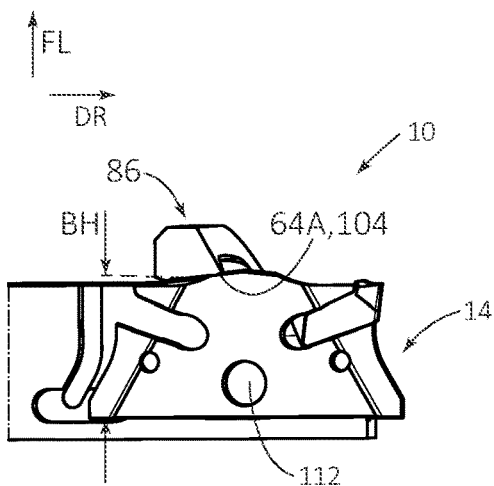
FIG. 8A is a partial side-perspective view of the tool assembly in FIG. 1A in a semi-mounted state, the view being in the same direction as the arrow designated "VA" in FIG. 9.
Figure 8B:
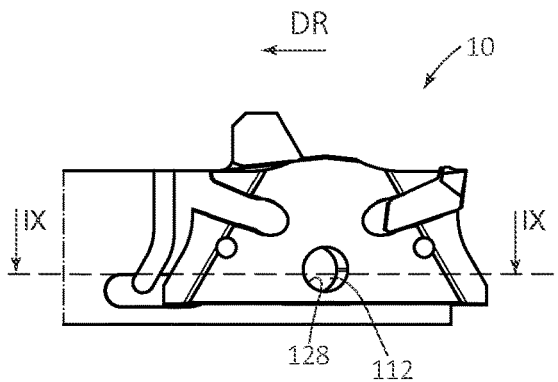
FIG. 8B is a partial side view of the tool assembly in FIG. 8A.
Figure 8C:
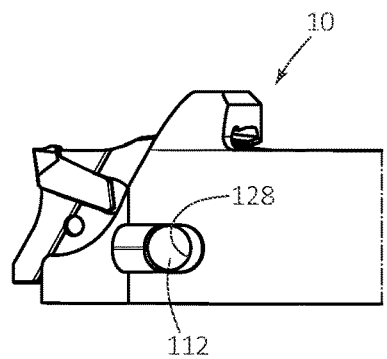
FIG. 8C is a partial side-perspective view of the tool assembly in FIG. 8A, the view being in the same direction as the arrow designated "VC" in FIG. 9
Figure 8D:
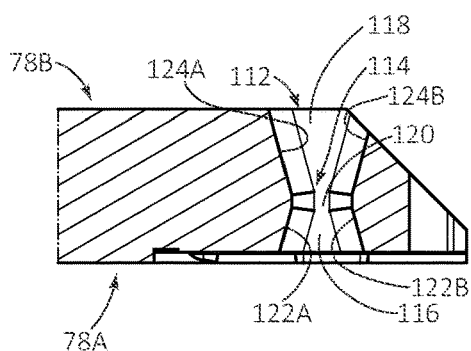
FIG. 8D is a section view of the holder taken along line VIIID-VIIID in FIG. 6C.

Referring to FIG. 8D it is shown that the holder guide hole 112 can comprise an advantageous constricted portion 114.

To elaborate, the holder guide hole 112 can comprise a first hole portion 116 opening out to the holder first side 78A, a second hole portion 118 opening out to the holder second side 78B, and a central hole portion 120 located between the first and second hole portions 116, 118.

The first hole portion 116 can comprise a first rearwardmost hole edge 122A and a first forwardmost hole edge 122B. The first rearwardmost hole edge 122A and the first forwardmost hole edge 122B taper (or, stated differently, converge) with proximity to the central hole portion 120.

The second hole portion 118 can comprise a second rearwardmost hole edge 124A and a second forwardmost hole edge 124B. The second rearwardmost hole edge 124A and the second forwardmost hole edge 124B taper (or, stated differently, converge) with proximity to the central hole portion 120.

Referring to FIGS. 7A to 7E, the tool assembly 10 is shown in a fully-mounted state. Some notable features from the view shown is the compact form of the tool assembly 10 and that in the side views of FIGS. 7C and 7E the holder guide hole 112 is not clearly visible as a circular opening.

To elaborate, a forwardmost propulsion hole portion 126 partially covers the holder guide hole 112. Thus when the propulsion-key 32 is inserted in the holder guide hole 112 (at an angle which is slanted to the first and second directions DS1, DS2, as will be explained when describing FIG. 9) it can contact the forwardmost propulsion hole portion 126 and move the blade 14 forward from the a fully-mounted state to a semi-mounted state still resting on the pocket bottom abutment surface 96 but no longer clamped by the holder clamp 86.

Referring to FIGS. 8A to 8C, the tool assembly 10 is shown in a semi-mounted state. In this position, while the blade's first sub-tapered edge 64A may contact the clamp top abutment surface 104 it is not held in position thereby. Stated differently the holder clamp 86 is in a normally-closed position impeding rearward motion of the blade 14.

Notably, in the side view of FIG. 8B the holder guide hole 112 is not clearly visible as a circular opening, but a rearwardmost propulsion hole portion 128 partially covers the holder guide hole 112. Thus when the propulsion-key 32 is inserted in the holder guide hole 112 (at an angle which is slanted to the first and second directions DS1, DS2) it can contact the rearwardmost propulsion hole portion 128 and move the blade 14 in the rearward direction DR from the semi-mounted state to the fully-mounted state shown in FIGS. 7A to 7E.

FIGS. 8A and 8C are angled views showing the circular opening of the holder guide hole 112 (i.e. showing a view at which the propulsion-key 32 will be inserted.

Figure 9:
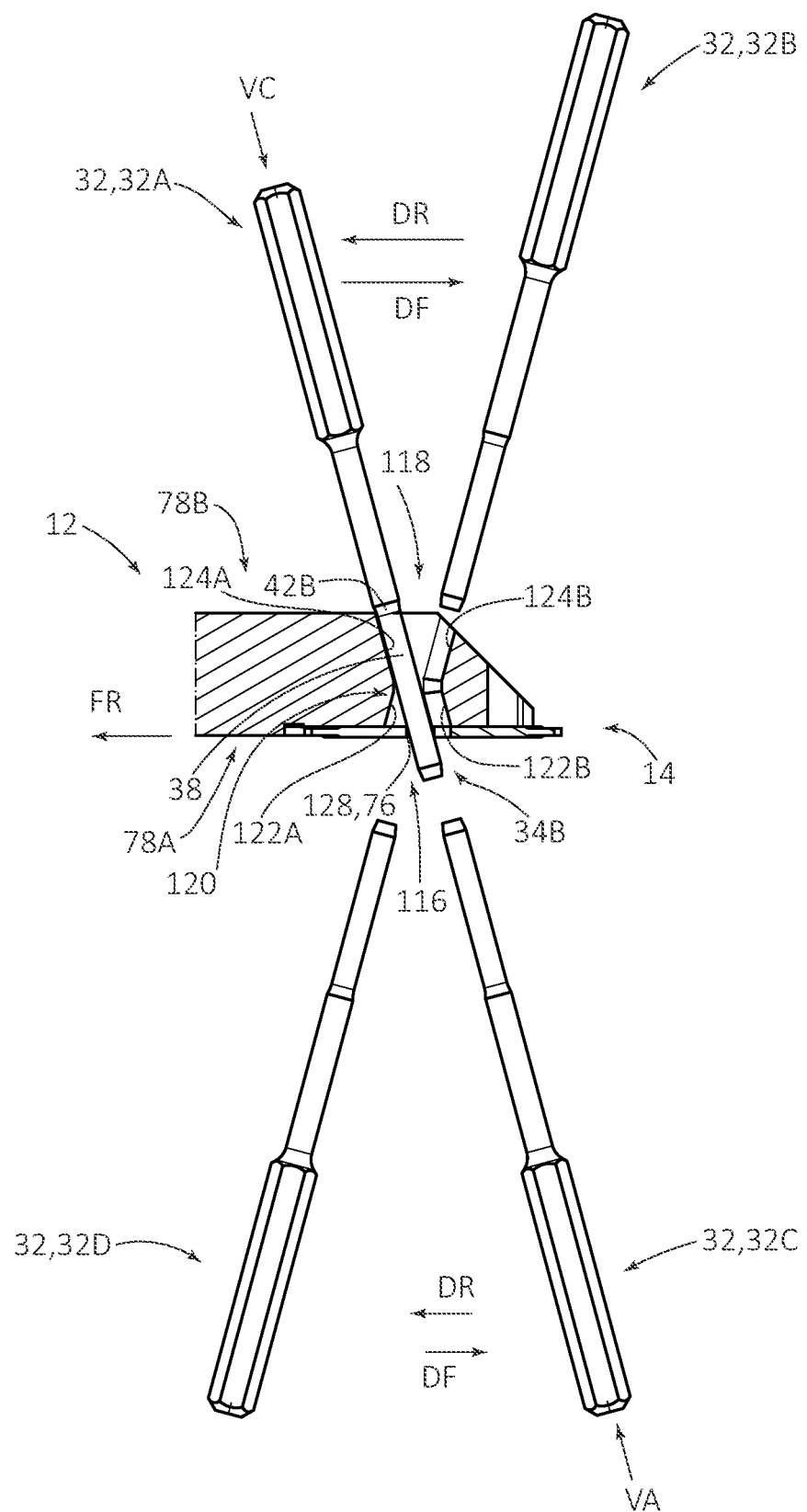
FIG. 9 is a section view of the tool assembly taken along line IX-IX in FIG. 8B with the propulsion-key of FIG. 3 schematically shown in four different positions.

Referring also to FIG. 9, the propulsion-key 32 (in the position designated 32A) is shown orientated parallel in the view direction designated "VC" corresponding to the view of FIG. 8C. Similarly, the propulsion-key 32 (in the position designated 32C) is shown orientated parallel in the view direction designated "VA" corresponding to the view of FIG. 8A.

For understanding only, the same propulsion key 32, is shown in first, second, third and fourth key positions (32A, 32B, 32C, 32D) to schematically explain how the exemplified blade 14 is brought between the semi-mounted and fully-mounted states.

To describe one exemplary manner of assembly according to the present embodiment, in operation, in a first step, the exemplified blade 14 is placed on the holder pocket 92 in a semi-mounted state as shown in FIG. 8C.

In a second step the propulsion-key 32 (referring to the first position 32A), and more precisely the second key end 34B, is inserted first into the holder guide hole 112 first through the holder second side 78B, then exiting the holder guide hole 112 through the holder first side 78A, then extending through the propulsion hole 76.

The propulsion-key 32 embodiment shown has a preferred but optional enlarged cross section starting at the second frustoconical portion 42B which abuts the holder 12 and prevents over insertion of the propulsion-key 32 into the holder guide hole 112 (i.e. a stopper function).

In the first position 32A, the operational portion 38 touches the second hole portion's second rearwardmost hole edge 124A and the blade's rearwardmost propulsion hole portion 128.

While leaving the propulsion-key 32 inside the holder guide hole 112 and the propulsion hole 76, the handle 36 is moved in the forward direction DF to bring the propulsion-key 32 to the orientation shown in the second position 32B (albeit with the propulsion-key 32 still within the holder guide hole 112 and the propulsion hole 76. This causes the operational portion 38 to pivot at the central hole portion 120 and apply a rearward force FR on the rearwardmost propulsion hole portion 128 and sliding the blade 14 in the rearward direction DR until the rearward movement is stopped by the blade's rear abutment surface 60 abutting the pocket rear abutment surface 98.

As will be understood schematically from FIG. 8A, since the maximum blade height BH of the blade 14 is larger than the minimum pocket height PM (FIG. 6C) so the rearward relative motion of the blade 14 causes an upward lifting force FL on the holder clamp 86.

After the blade 14 is in the fully mounted position (e.g. FIG. 7C), the resilient holder clamp 86 exerts a configured downward force FD on the blade 14 to hold it in the holder pocket 92.

Thus the blade 14 is now fully-mounted to the holder 12 as shown in FIG. 7C.

To bring the blade 14 back to the semi-mounted state, a third step can include the opposite movements to the first two-steps. Namely, the propulsion-key 32 is inserted in the orientation shown as the second position 32B into the holder guide hole 112 and the propulsion hole 76 and the handle 36 is moved in the rearward direction DR (this time abutting the blade's forwardmost propulsion hole portion 126).

An alternative option for performing the second step above will now be briefly described. Such step could have been performed by the propulsion-key 32 shown in the third position 32C, being inserted first through the propulsion hole 76, then the holder guide hole 112 at the holder first side 78A, then exiting the holder guide hole 112 through the holder second side 78B.

After said insertion, the operational portion 38 would touch the same portions of the holder 12 as described before, namely second hole portion's second rearwardmost hole edge 124A and the blade's rearwardmost propulsion hole portion 128.

The handle 36 would then be moved, this time, in the rearward direction DR, since the propulsion key's handle 36 is adjacent the holder first side 78A, to bring the propulsion-key 32 to the orientation shown in the fourth position 32D (albeit with the propulsion-key 32 still within the holder guide hole 112 and the propulsion hole 76. This causes the same rearward force described above.

Similarly, to bring the blade 14 back to the semi-mounted state, the propulsion-key 32 is inserted in the orientation shown as 32D, first through the propulsion hole 76 then the holder guide hole 112, and the handle 36 is then moved in the forward direction DF.

It will be understood that bringing the blade 14 to the fully-mounted state could be done with the propulsion-key inserted at one side of the holder 12, and bringing the blade 14 to the semi-mounted state could be done with the propulsion-key 32 being inserted from the other side of the holder 12.

The above-described tool assembly 10 example has numerous advantages, for example minimized risk of damaging the holder clamp 86 (since an operator does not directly move it), and no falling parts (since the propulsion-key 32 remains within the parts during each state).

Figure 10B:
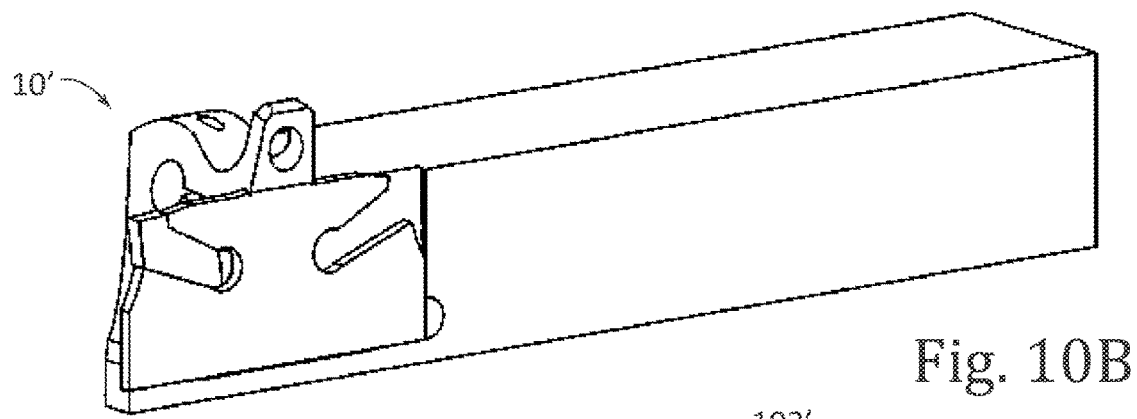
FIG. 10B is a side perspective view of the tool assembly in FIG. 10A.
Figure 10C:
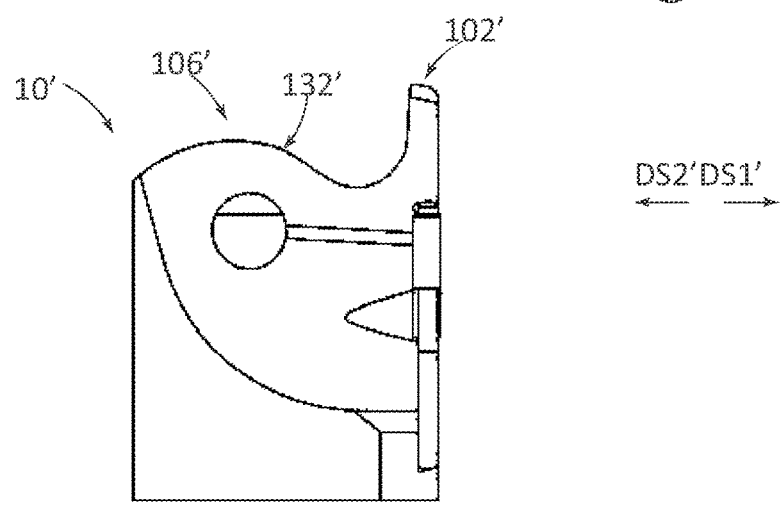
FIG. 10C is a front view of the tool assembly in FIG. 10A.
Figure 11A:
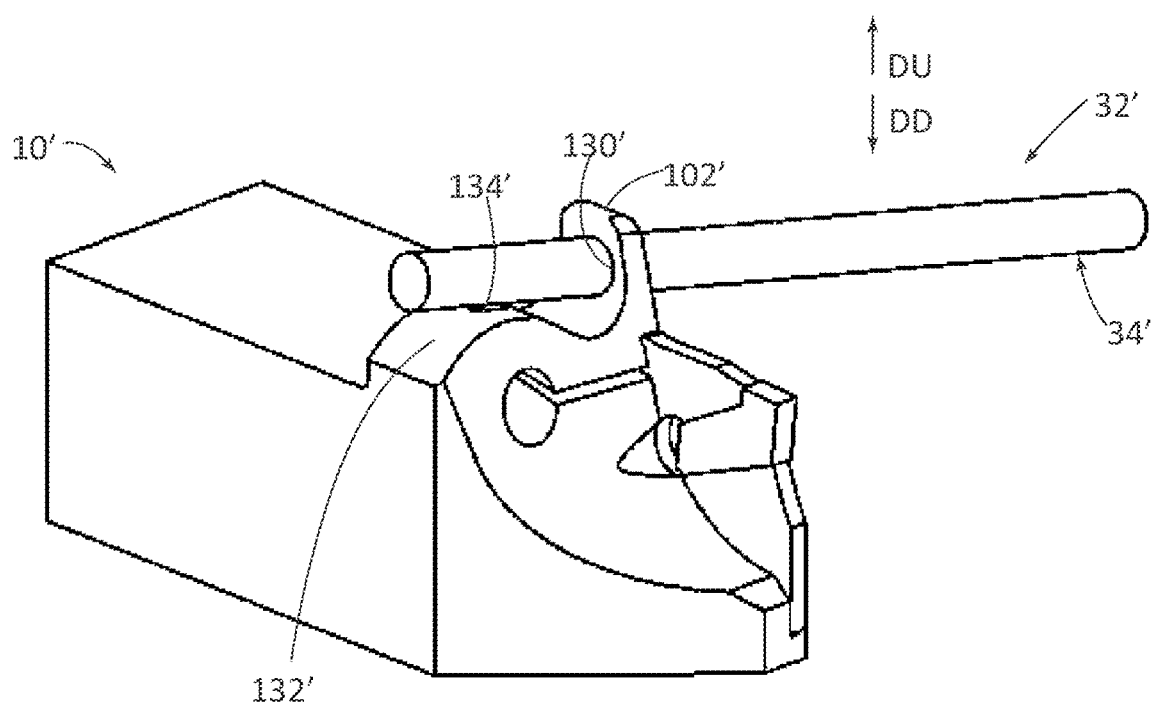
FIG. 11A is a side perspective view of the tool assembly in FIG. 10A, further comprising a propulsion-key.
Figure 11B:
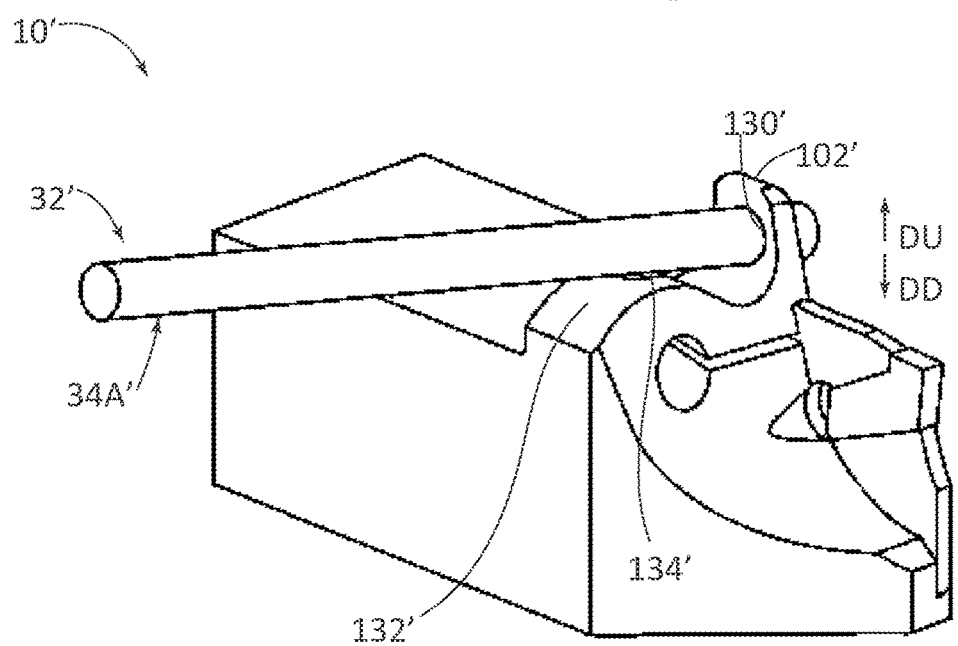
FIG. 11B is a side perspective view of the tool assembly in FIG. 11A, from a different side to that shown in FIG. 11A.

Nonetheless, an even more compact blade or cutting insert without the height required for a propulsion hole could be used in the embodiment shown in FIGS. 10 to 11B.

Only significant differences will be described in detail, with an apostrophe (') being used to indicate features with similar functions. Features which are not clearly different to the previous embodiment can be assumed to be the same.

Referring to FIGS. 10A to 11B, a second Swiss tool assembly 10' is exemplified. The assembly 10' comprises a holder 12', a blade 14' mounted to the holder 12', and a cutting insert 16' mounted to the blade 14'.

The cutting insert 16' is the same type as the previous cutting insert 16 described.

A propulsion-key 32' (FIGS. 11A and 11B) exemplified is a mere cylindrical rod, but could also have any of the features of the previously described propulsion-key 32.

The blade 14' differs primarily in that the top edge tapered portion 64' does not comprise two sub-tapered edges which are slanted but merely extends parallel with a blade bottom edge 48, and that the blade 14' is devoid of a propulsion hole. Aside from these two differences which are connected to function, the blade 14' could also have any of the features of the previously described blade 14.

The holder 12' differs primarily in that it is devoid of a holder guide hole and instead the holder clamp 86' comprises a clamp hole 130'.

More precisely, the clamp hole 130' is formed in the clamp portion 102' of the holder clamp 86'. Additionally, the clamp hole 130' faces the first and second side directions DS1', DS2' (FIG. 10C; the directions shown are optionally shown as the opposite directions of the previous example because the holder pocket of the present example is on the other side of the holder 12', however a skilled person will understand that the specific side is irrelevant to the present invention), allowing side access for the propulsion-key 32' from either side as shown in FIGS. 11A and 11B.

Additionally, the clamp's an intermediary portion 106' comprises an upward leverage projection 132' (which is preferably but optionally convex as shown).

The leverage projection 132' can further comprise a guide recess 134' directed towards the clamp hole 130' (i.e. parallel to the first and second side directions DS1', DS2') for stabilizing the propulsion-key 32' when abutted thereby.

Referring particularly to FIGS. 11A and 11B, it is shown that the propulsion-key 32' can be inserted through the clamp hole 130' in either the first and second side directions DS1', DS2' and leveraged or pivoted off the leverage projection 132' such that the first key end 34A' is moved in the downward direction DD to apply a force on the clamp portion 102' in the upward direction DU.

Subsequently, the blade 14' (or a cutting insert) could be inserted into the holder pocket 92, specifically to be placed on the pocket bottom abutment surface 96.

By subsequently removing the upward force, the clamp portion 102' will then resiliently move downwardly and secure the blade 14' to the holder 12'.

What is claimed is:

1. A holder comprising:
   opposing holder first and second sides defining a first side direction from the holder second side towards the holder first side, and a second side direction opposite to the first side direction;
   opposing holder front and rear ends defining a forward direction from the holder rear end towards the holder front end, and a rearward direction opposite to the forward direction side direction;
   opposing holder top and bottom sides defining an upward direction from the holder bottom side towards the holder top side, and a downward direction opposite to the upward direction;
   a holder pocket located at an intersection of the holder first side, holder front end and holder top side, the holder pocket comprising:
      a pocket side abutment surface extending along the holder first side and facing the first side direction;
      a pocket bottom abutment surface located downward of the pocket side abutment surface and facing the upward direction; and a pocket rear abutment surface located rearward of the pocket side abutment surface and facing the forward direction; and a holder clamp located at the holder top side, the holder clamp extending over the pocket side abutment surface and comprising:

a resilient hinge portion;

a clamp portion comprising a clamp top abutment surface facing in the downward direction; and an intermediary portion extending from the resilient hinge portion to the clamp portion;

wherein:

the resilient hinge portion being normally-closed such that the resilient hinge portion is configured to resiliently bias the clamp portion downwardly.

2. The holder according to claim 1, wherein:

the pocket bottom abutment surface also faces the second side direction and hence is inwardly slanted to face the upward and second side direction; and the clamp top abutment surface also faces the second side direction and hence is inwardly slanted to face the downward and second side directions.

3. The holder according to claim 1, wherein the holder further comprises a holder guide hole opening out to the pocket side abutment surface.

4. The holder according to claim 3, wherein the holder guide hole comprises a constricted portion.

5. The holder according to claim 4, wherein the holder guide hole is hourglass shaped.

6. The holder according to claim 1, wherein the holder comprises an elongated shank portion and a head portion extending forward of the shank portion, the holder pocket being at least partially formed on the head portion at the holder first side.

7. The holder according to claim 6, wherein the holder pocket extends rearward of the head portion.

8. The holder according to claim 6, wherein, in a front view of the holder, the shank portion has a profile and the only portion of the holder that extends outside the shank portion's profile extends in the upward direction.

* * * * *